(12) United States Patent
You et al.

(10) Patent No.: US 10,328,851 B2
(45) Date of Patent: Jun. 25, 2019

(54) VEHICLE AND CONTROL METHOD THEREOF

(71) Applicant: HYUNDAI MOTOR COMPANY, Seoul (KR)

(72) Inventors: Jung Keun You, Suwon-si (KR); Jinseok Hong, Suwon-si (KR); MunHwan Cho, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/380,385

(22) Filed: Dec. 15, 2016

(65) Prior Publication Data

US 2018/0118106 A1     May 3, 2018

(30) Foreign Application Priority Data

Nov. 1, 2016  (KR) .................. 10-2016-0144286

(51) Int. Cl.
*B60Q 5/00*         (2006.01)
*G06K 9/00*         (2006.01)
(Continued)

(52) U.S. Cl.
CPC ............. *B60Q 5/008* (2013.01); *B60W 50/00* (2013.01); *G06K 9/00369* (2013.01);
(Continued)

(58) Field of Classification Search
CPC ..... B60Q 5/008; G06K 9/00369; G08G 1/005
See application file for complete search history.

(56) References Cited

U.S. PATENT DOCUMENTS

2004/0183906 A1*  9/2004  Nagaoka .................. B60R 1/00
                                                                    348/148
2009/0154736 A1*  6/2009  Lee ........................ H04R 1/323
                                                                    381/300
(Continued)

FOREIGN PATENT DOCUMENTS

JP          2014-61786 A      4/2014
JP          5516454 B2        6/2014
(Continued)

*Primary Examiner* — James J Yang
(74) *Attorney, Agent, or Firm* — Knobbe Martens Olson & Bear LLP

(57) ABSTRACT

Disclosed are a vehicle and a control method thereof, and more particularly, a technique for acquiring location information of a pedestrian near a vehicle, predicting a movement path of the pedestrian, and outputting warning sounds in a direction toward where the pedestrian is moving. The vehicle includes an imaging device configured to capture an image of a pedestrian near the vehicle, a detection sensor configured to acquire location information of the pedestrian, a controller configured to predict a movement route of the pedestrian based on the acquired location information of the pedestrian and generate a control signal for outputting warning sounds in a direction toward where the pedestrian is moving based on the predicted movement route of the pedestrian; and a speaker array configured to output the warning sounds in the direction toward where the pedestrian is moving based on the generated control signal.

26 Claims, 20 Drawing Sheets

(51) Int. Cl.
*G08G 1/005* (2006.01)
*B60W 50/00* (2006.01)
*G08G 1/16* (2006.01)

(52) U.S. Cl.
CPC ..... *G06K 9/00791* (2013.01); *G06K 9/00805* (2013.01); *G08G 1/005* (2013.01); *G08G 1/166* (2013.01)

(56) References Cited

U.S. PATENT DOCUMENTS

2014/0085470 A1* 3/2014 Sako ................. G03B 21/006
                                                          348/148
2016/0121791 A1* 5/2016 Shimizu .............. G08G 1/166
                                                          340/435

FOREIGN PATENT DOCUMENTS

| JP | WO 2014192369 A1 * | 12/2014 | ............. B60Q 1/525 |
| KR | 10-1017735 B1 | 2/2011 | |
| KR | 10-2011-0109270 A | 10/2011 | |
| WO | WO-2014192369 A1 * | 12/2014 | ............. B60Q 1/525 |

* cited by examiner

VEHICLE AND CONTROL METHOD THEREOF

CROSS-REFERENCE TO RELATED APPLICATION

This application claims the benefit of Korean Patent Application No. 10-2016-0144286, filed on Nov. 1, 2016 in the Korean Intellectual Property Office, the disclosure of which is incorporated herein by reference.

BACKGROUND

1. Field

Embodiments of the present disclosure relate to a vehicle and a control method thereof, and more particularly, to a technique for acquiring location information of a pedestrian near a vehicle, predicting a movement route of the pedestrian, and outputting warning sounds in a direction toward where the pedestrian is moving.

2. Description of the Related Art

A vehicle is a device for carrying or transporting people or objects to their destinations while running on a road or track. A vehicle can move to several locations by using one or more wheels installed on a body of the vehicle. Examples of the vehicle may include a three-wheeled or four-wheeled vehicle, a two-wheeled vehicle such as a motorcycle, a construction machine, a bicycle, and a train which runs on rails of a track.

In modern society, an automobile is the most common means of transportation, and the number of people using automobiles is increasing. Development of automotive technology facilitates long-distance movement and makes daily life easier. However, road traffic conditions may deteriorate in a place with a high population density such as South Korea, thus causing frequent occurrence of serious traffic congestion.

As a system for preventing traffic accidents between vehicles and pedestrians during road driving, there has been used a technique for using a sensor installed in a vehicle to output warning sounds to a driver of the vehicle when a pedestrian is within a certain distance from the vehicle so that the driver may recognize this situation. However, such a technique has a problem in that warning sounds should be driver triggered and thus cannot be promptly and properly output to the pedestrian.

Also, along with rapid development of electric vehicles, many vehicles with no noise sources are being developed. When an engine is not installed in such a vehicle, there is almost no noise produced by the vehicle. Accordingly, pedestrians have difficulty in recognizing the presence of the vehicle.

The disclosure of this section is to provide background of the invention. Applicant notes that this section may contain information available before this application. However, by providing this section, Applicant does not admit that any information contained in this section constitutes prior art.

SUMMARY

An aspect of the present disclosure to facilitate a pedestrian's recognition of a vehicle by acquiring location information of a pedestrian near the vehicle, predicting a movement route of the pedestrian in real time, and outputting warning sounds in a direction toward where the pedestrian is moving, thus preventing an accident in advance and reducing generation of unnecessary noise.

In accordance with one aspect of the present disclosure, a vehicle includes an imaging device configured to capture an image of a pedestrian near the vehicle, a detection sensor configured to acquire location information of the pedestrian, a controller configured to predict a movement route of the pedestrian based on the acquired location information of the pedestrian and generate a control signal for outputting warning sounds in a direction toward where the pedestrian is moving based on the predicted movement route of the pedestrian, and a speaker array configured to output the warning sounds in the direction toward where the pedestrian is moving based on the generated control signal.

The detection sensor may acquire coordinate information of the pedestrian with respect to the vehicle.

The detection sensor may acquire coordinate information that varies with the movement of the pedestrian.

The detection sensor may detect a distance between the vehicle and the pedestrian.

The controller may calculate a movement speed of the pedestrian based on the coordinate information that varies with the movement of the pedestrian.

The controller may determine a movement direction of the pedestrian based on the coordinate information that varies with the movement of the pedestrian.

The controller may predict the movement route of the pedestrian based on the calculated movement speed of the pedestrian and the determined movement direction of the pedestrian.

The detection sensor may include at least one of a radar device and a LiDAR device.

The controller may generate a control signal for removing warning sounds output in a direction toward where the pedestrian is not moving based on the predicted movement route of the pedestrian.

When there are a plurality of pedestrians, the controller may predict movement routes of the plurality of pedestrians and generate a control signal for outputting warning sounds in directions toward where the plurality of pedestrians are moving based on the predicted movement routes.

The controller may generate a control signal for outputting warning sounds in a direction in which the pedestrian is located based on the acquired location information of the pedestrian when the detected distance between the vehicle and the pedestrian is less than or equal to a predetermined distance.

The controller may control intensities of the warning sounds output by the speaker array based on the detected distance between the vehicle and the pedestrian.

The speaker array may output the warning sounds in the direction in which the pedestrian is located based on the generated control signal.

The imaging device may acquire coordinate information of the pedestrian with respect to the vehicle by capturing the image of the pedestrian.

The speaker array may be provided at a front of the vehicle and include at least one speaker that outputs warning sounds.

In accordance with another aspect of the present disclosure, a vehicle control method includes capturing an image of a pedestrian near a vehicle to detect the pedestrian, acquiring location information of the pedestrian, predicting a movement route of the pedestrian based on the acquired location information of the pedestrian, generating a control signal for outputting warning sounds in a direction toward where the pedestrian is moving based on the predicted movement route of the pedestrian, and outputting the warning sounds in the direction toward where the pedestrian is moving based on the generated control signal.

The acquiring of location information of the pedestrian may include acquiring coordinate information of the pedestrian with respect to the vehicle.

The acquiring of location information of the pedestrian may include acquiring coordinate information that varies with the movement of the pedestrian.

The vehicle control method may further include detecting a distance between the vehicle and the pedestrian.

The predicting of a movement route of the pedestrian may include calculating a movement speed of the pedestrian based on coordinate information that varies with the movement of the pedestrian.

The predicting of a movement route of the pedestrian may include determining a movement direction of the pedestrian based on coordinate information that varies with the movement of the pedestrian.

The predicting of a movement route of the pedestrian may include predicting the movement route of the pedestrian based on the calculated movement speed of the pedestrian and the determined movement direction of the pedestrian.

The generating of a control signal may include removing warning sounds output in a direction toward where the pedestrian is not moving based on the predicted movement route of the pedestrian.

The generating of a control signal may include, when there are a plurality of pedestrians, predicting movement routes of the plurality of pedestrians, and generating a control signal for outputting warning sounds in directions toward where the plurality of pedestrians are moving based on the predicted movement routes.

The generating of a control signal may include generating a control signal for outputting warning sounds in a direction in which the pedestrian is located based on the acquired location information of the pedestrian when the detected distance between the vehicle and the pedestrian is less than or equal to a predetermined distance.

The generating of a control signal may include controlling intensities of the warning sounds output by the speaker array based on the detected distance between the vehicle and the pedestrian.

The outputting of warning sounds may include outputting the warning sounds in the direction in which the pedestrian is located based on the generated control signal.

The capturing of an image of a pedestrian near a vehicle to detect the pedestrian may include acquiring coordinate information of the pedestrian with respect to the vehicle by capturing the image of the pedestrian.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
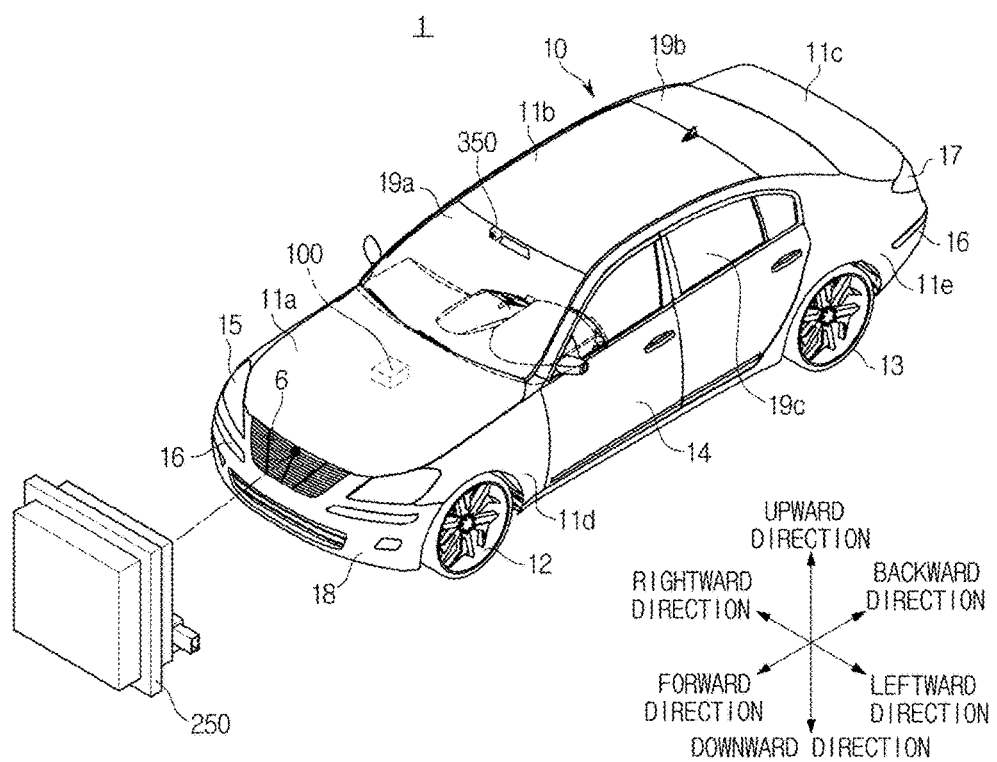
FIG. 1 is a perspective view schematically showing an external appearance of a vehicle according to an embodiment.

Reference will now be made in detail to the embodiments of the present disclosure, examples of which are illustrated in the accompanying drawings, wherein like reference numerals refer to like elements throughout.

This disclosure does not describe all elements of embodiments, and a general description in a technical field to which the present invention belongs or a repetitive description in the embodiments will be omitted. As used herein, a "unit," "module," "member," or "block" may be implemented as software or hardware. Depending on embodiments, a plurality of "units," "modules," "members," or "blocks" may be implemented as one element, or one "unit," "module," "member," or "block" may include a plurality of elements.

In this disclosure below, when one part is referred to as being "connected" to another part, it should be understood that the former can be "directly connected" to the latter, or "indirectly connected" via a wireless communication network.

Furthermore, when one part is referred to as "comprising" (or "including" or "having") other elements, it should be understood that it can comprise (or include or have) only those elements, or it can comprise (or include or have) other elements as well as those elements unless specifically described otherwise.

Relational terms such as first, second, and the like may be used to distinguish one element from another, and the elements should not be limited by the terms. The singular forms "a," "an," and "the" are intended to include the plural forms as well unless clearly indicated otherwise by text.

Reference numerals of steps are used for convenience of description and do not describe an order of the steps. Accordingly, the steps may be performed in a different order from that described herein, unless clearly indicated otherwise by text.

Hereinafter, a functional principle and embodiments of the present invention will be described with reference to the accompanying drawings.

An aspect of the present invention discloses a system and method for providing an alarming sound to a pedestrian in front of the vehicle.

In embodiments, an array of speakers 400 is arranged in a front portion of the vehicle 1. Speakers of the speaker array can be controlled individually or in combination to generate a directional alarming sound to a pedestrian in front of the vehicle 1. In embodiments, the speakers 400 are controlled such that the alarming sound has a higher volume or intensity in a selected direction toward the pedestrian.

In embodiments, a computerized controller detects a pedestrian in front of the vehicle and determines a location of the pedestrian (distance and/or direction from the vehicle) using signals from at least one sensor installed in the vehicle. In embodiment, the controller processes images (video frames) captured by a camera installed in the vehicle and determines a distance and a direction of the pedestrian from a point of the vehicle. In embodiments, using the determined direction of the pedestrian, the controller caused the speaker to generate a directional alarming sound toward the detected such that a sound beam of the alarming sound is directed toward the pedestrian.

Figure 10:
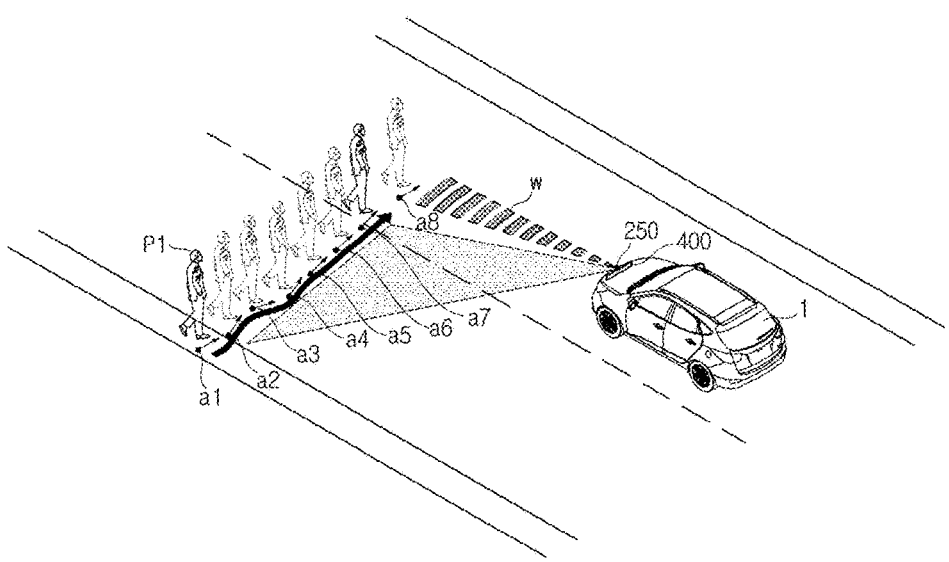
FIGS. 10 and 11 are conceptual views each showing an example of predicting a movement route of a pedestrian and outputting warning sounds according to an embodiment
Figure 11:
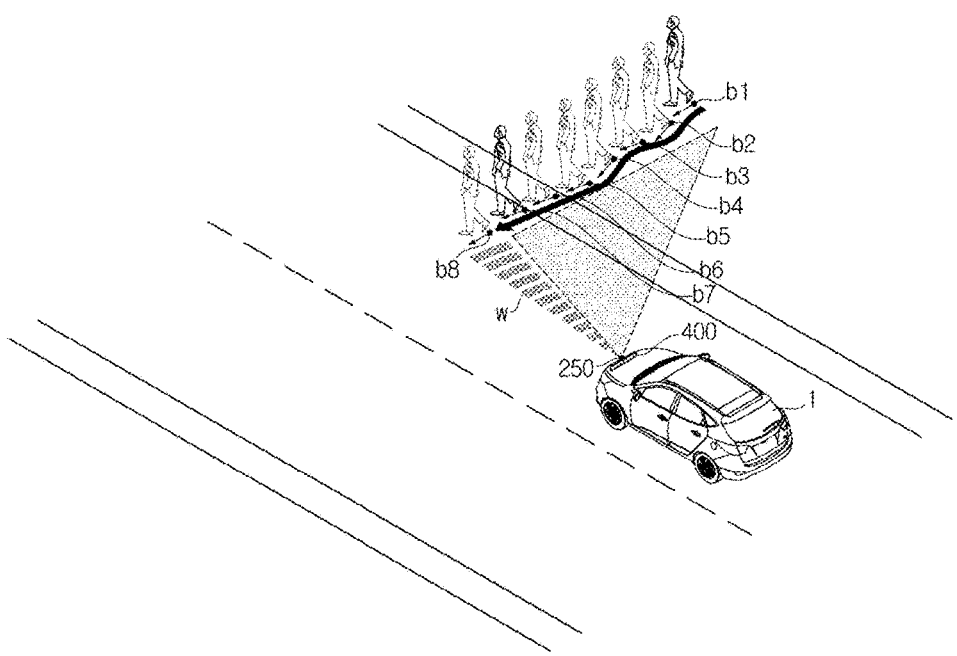

In embodiments, as illustrated in FIG. 10, when the pedestrian is detected in a fan-shape orientation segment Z8, the alarming sound from the speakers 40 has a higher volume or intensity in the segment Z8 when compared to other segments Z1 to Z7 in which no pedestrian is detected. In embodiments, as illustrated in FIG. 11, the alarming sound from the speakers 40 has higher volume or intensity in two or more orientation segments (Z4, Z5) than other segments (Z1-Z3, Z6-Z8), when the location or direction of the pedestrian is within a predetermined angler distance from the two or more orientation segments.

Figure 12:
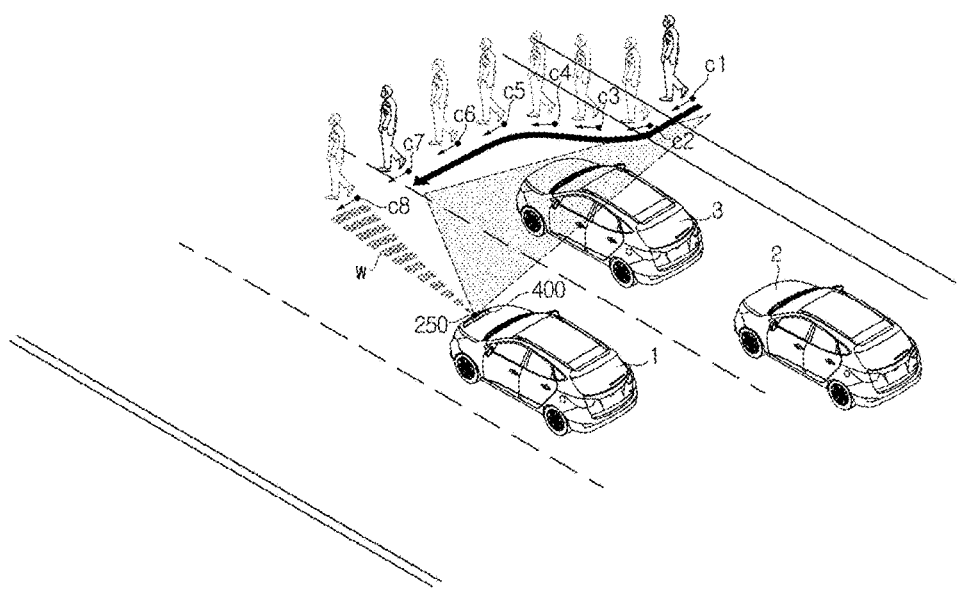
FIG. 12 is a conceptual view showing an example of predicting a movement route of a pedestrian and outputting warning sounds when there is an obstacle according to an embodiment.

In embodiments, as illustrated in FIG. 12 when the controller detects two or more pedestrians (P5, P6, P7), the controller generates a multi-directional alarming sound that has higher volume(s) in multiple directions towards the two or more pedestrians. In embodiments, the controller selects two or more from a set of predetermined orientation segments (Z1-Z8) and sets the volume or intensity of the alarm sound in the selected segments than other segments in which no pedestrians is detected or located.

In embodiments, as a pedestrian is moving, the system follows the movement and predicts the movement of the pedestrian in a future time frame using a sequence of images (vide frames) captured at the camera of the vehicle. In embodiments, the system predicts a trajectory of the pedestrian using the pedestrian previous locations in the previous images. In embodiments, the system predicts the pedestrian's moving direction and speed by analyzing the previous images. When the system determines a future location of the pedestrian, in a future time frame, the system generates an alarming sound directed toward the future location even when the pedestrian is not visible or discoverable in a captured image of the future time frame. In embodiments, according to the tracked movement of the detected pedestrian, the system changes its directionality of the alarming sound time frame by time frame activation different set of speakers in the speaker array. In embodiments, subsequent to analysis on a currently available image sequence for tracking movement of the pedestrian, the system generates information for generating a scheduled alarm toward a future location of the pedestrian using the pedestrian's moving direction and speed computed from the image sequence.

FIG. 1 is a perspective view schematically showing an external appearance of a vehicle according to an embodiment.

For convenience of description, as shown in FIG. 1, a direction in which a vehicle 1 advances is defined as a forward direction, and a leftward direction and a rightward direction are distinguished with respect to the forward direction. For example, when the forward direction is a 12 o'clock direction, a 3 o'clock direction or the like is defined as the rightward direction, and a 9 o'clock direction or the like is defined as the leftward direction. A direction opposite to the forward direction is referred to as a backward direction. Also, with respect to the vehicle 1, a bottom direction is referred to as a downward direction, and a direction opposite to the downward direction is referred to as an upward direction. In addition, a surface disposed in the forward direction is referred to as a front surface, a surface disposed in the backward direction is referred to as a rear surface, and a surface disposed in the side direction is referred to a side surface. Among side surfaces, a side surface in the leftward direction is defined as a left side surface, and a side surface in the rightward direction is defined as a right side surface.

Referring to FIG. 1, the vehicle 1 may include a main body 10 forming an external appearance of the vehicle 1 and wheels 12 and 13 for moving the vehicle 1.

The main body 10 may include a hood 11a configured to protect various types of devices needed to drive the vehicle 1, such as an engine, a loop panel 11b configured to form an internal space, a trunk lid 11c configured to provide storage space, and a front fender 11d and a quarter panel 11e provided on a side surface of the vehicle 1. Also, a plurality of doors 14 that are hinge-connected to the main body 10 may be provided on side surfaces of the main body 10.

A front window 19a that provides forward visibility of the vehicle 1 may be provided between the hood 11a and the loop panel 11b, and a rear window 19b that provides backward visibility may be provided between the loop panel 11b and the trunk lid 11c. Also, a side window 19c that provides sideward visibility may be provided at an upper portion of each of the doors 14.

Also, a headlamp 15 that provides illumination in a traveling direction of the vehicle 1 may be provided at the front of the vehicle 1.

Also, a turn signal lamp 16 may be provided at the front or rear of the vehicle 1 to indicate the traveling direction of the vehicle 1.

The vehicle 1 may blink the turn signal lamp 16 to display the traveling direction. Also, a tail lamp 17 may be provided at the rear of the vehicle 1. The tail lamp 17 may be provided at the rear of the vehicle 1 to display a gear shift state, brake operation state, and the like of the vehicle 1.

The vehicle 1 may include a detection sensor 250. The detection sensor 250 may acquire location information of a pedestrian near the vehicle 1. In detail, the detection sensor 250 may acquire coordinate information regarding a pedestrian with respect to the vehicle 1. The detection sensor 250 may acquire coordination information that varies with movement of the pedestrian in real time and may detect a distance between the vehicle 1 and the pedestrian.

The detection sensor 250 may be provided at a radiator grill 6 of the vehicle 1 and has no restrictions in installation place and number. Also, the detection sensor 250 may be implemented with various types of devices such as a radar device using millimeter waves or microwaves, a Light Detection And Ranging (LiDAR) device using pulse laser light, a vision sensor using visible light, an infrared sensor using infrared rays, or an ultrasonic sensor using ultrasonic waves. The detection sensor 250 may be implemented with only one or a combination of sensors.

When the detection sensor 250 is implemented with a radar device, the detection sensor 250 may emit millimeter waves or microwaves in a forward direction of the vehicle 1 and receive millimeter waves or microwaves reflected by a pedestrian near the vehicle 1. When millimeter waves or microwaves are received, the detection sensor 250 may detect physical characteristics such as distance, speed, and feature of a forward pedestrian from a reception time and a variation in intensity or frequency of the waves.

As described below, the detection sensor 250 may acquire location information of a pedestrian near the vehicle 1 while the vehicle 1 is running or parked. However, an imaging device 350 may also capture an image of a pedestrian to detect the pedestrian and may also acquire location information of the pedestrian.

However, since the imaging device 350 captures an image and detects a pedestrian from the captured image, the imaging device 350 may be affected by image quality or weather. That is, under an environment of dark lighting, cloudy weather, a foggy weather, or the like, an image quality of an image captured by the imaging device 350 is not good, and it may be difficult to detect a pedestrian and acquire location information of the pedestrian on the basis of the poor image. However, when the detection sensor 250 is implemented with a radar or LiDAR device, the detection sensor 250 may acquire location information of a pedestrian on the basis of millimeter waves or microwaves. Thus, the detection sensor 250 is less affected by an external environment such as weather and may more accurately and easily track a location of a pedestrian in real time even though the location varies in real time. The detection sensor 250 is merely an embodiment of detecting a pedestrian, acquiring location information of the pedestrian, and tracking a location and movement of the pedestrian. The detection sensor 250 is not necessarily implemented as a LiDAR device, and there may be various embodiments.

Hereinafter, it will be assumed that the detection sensor 250 is implemented with a radar device for convenience of description.

At least one controller 100 may be provided inside the vehicle 1. The controller 100 may be configured to perform electronic control associated with operation of the vehicle 1. The controller 100 may be installed at an arbitrary position inside the vehicle 1 according to a designer's selection. For example, the controller 100 may be installed between an engine compartment and a dash board or may be provided inside a center fascia. The controller 100 may include at least one processor configured to receive an electric signal, process the received electric signal, and then output the processed signal. The at least one processor may be implemented with at least one semiconductor chip and its associated components. The at least one semiconductor chip and its associated components may be installed in a printed circuit board installable in the vehicle 1.

At least one imaging device 350 may be provided inside the vehicle 1. The imaging device 350 may capture surrounding images of the vehicle 1 while the vehicle 1 is running or parked and detect a pedestrian near the vehicle 1. Furthermore, the imaging device 350 may acquire location information of the pedestrian.

Figure 2:
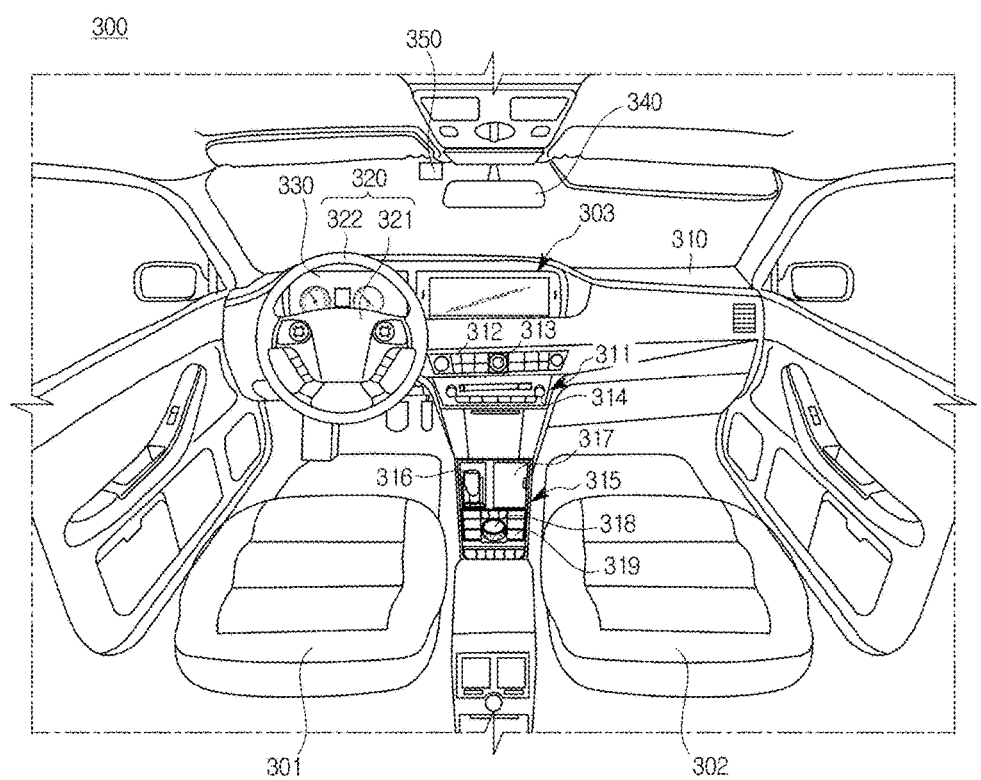
FIG. 2 is a diagram showing an internal structure of a vehicle according to an embodiment.

FIG. 2 is a diagram showing an internal structure of a vehicle according to an embodiment.

Referring to FIG. 2, a driver seat 301, a passenger seat 302, a dashboard 310, a steering wheel 320, and an instrument panel 330 are provided inside a passenger compartment 300.

The dashboard 310 refers to a panel which partitions the passenger compartment and the engine compartment of the vehicle 1 and in which various types of components necessary for driving are installed. The dashboard 310 is provided in front of the driver seat 301 and the passenger seat 302. The dashboard 310 may include an upper panel, a center fascia 311, a gear box 315, etc.

An on-vehicle display device 303 may be installed in the upper panel of the dashboard 310. The on-vehicle display device 303 may provide a variety of information to a driver or a passenger of the vehicle 1. For example, the on-vehicle display device 303 may visually provide a variety of information such as a map, weather, news, various kinds of video or still images, and various kinds of information associated with status or operation of the vehicle 1, for example, information on an air conditioner. Also, the on-vehicle display device 303 may provide a risk-based warning to a driver or a passenger. In detail, when the vehicle 1 changes lanes, the on-vehicle display device 303 may provide different warnings to a driver or the like depending on risk level. Also, the on-vehicle display device 303 may be implemented using a typical navigation device.

The on-vehicle display device 303 may be built in a housing that is integrally formed with the dashboard 310 so that only a display panel is exposed to the outside. Also, the on-vehicle display device 303 may be installed at the middle or lower portion of the center fascia 311 or may be installed at an inner surface of the front window 19a or on the top of the dashboard 310 using a separate supporter (not shown). In addition, the on-vehicle display device 303 may be installed at various positions that may be considered by a designer.

Various kinds of devices such as a processor, a communication module, a Global Positioning System (GPS) module, and a storage device may be installed inside the dashboard. The processor installed in the vehicle 1 may be provided to control various types of electronic devices installed in the vehicle 1. As described above, the processor may be provided to perform a function of the controller 100. The above-mentioned devices may be implemented with various components such as a semiconductor chip, a switch, an integrated circuit, a resistor, a volatile or non-volatile memory, and a printed circuit board.

The center fascia 311 may be installed at the center of the dashboard 310 and may be provided with input units 312 to 314 for entering various types of commands associated with the vehicle 1. The input units 312 to 314 may be implemented with a physical button, a knob, a touch pad, a touch screen, a stick-type manipulation device, or a trackball. A driver may control various kinds of operations of the vehicle 1 by manipulating the input units 312 to 314 and input units 318 and 319.

The gear box 315 is provided under the center fascia 311 and between the driver seat 301 and the passenger seat 302. The gear box 315 may be provided with a gear 316, a compartment box 317, various kinds of input units 318 and 319, and the like. The input units 318 and 319 may be implemented with a physical button, a knob, a touch pad, a touch screen, a stick-type manipulation device, or a trackball. The compartment box 317 and the input units 318 and 319 may not be provided depending on the embodiment.

The steering wheel 320 and the instrument panel 330 are provided on a driver's side of the dashboard 310.

The steering wheel 320 may be provided to be rotatable in a certain direction according to a driver's manipulation. The vehicle 1 may be steered by rotating front wheels or rear wheels of the vehicle 1 according to a rotational direction of the steering wheel 320. The steering wheel 320 is provided with a spoke 321 connected to a rotary shaft and a handle wheel 322 coupled to the spoke 321. The spoke 321 may be provided with an input unit for entering various types of commands, and the input unit may be implemented with a physical button, a knob, a touch pad, a touch screen, a stick-type manipulation device, or a trackball. The handle wheel 322 may have a circular shape for a driver's convenience, but is not limited thereto. A vibrating unit 201 (see FIG. 4) may be installed inside at least one of the spoke 321 and the handle wheel 322 to vibrate the at least one of the spoke 321 and the handle wheel 322 at a predetermined intensity according to external control. Depending on the embodiment, the vibrating unit 201 may vibrate at various intensities according to an external control signal. Thus, the at least one of the spoke 321 and the handle wheel 322 may be vibrated at various intensities according to an external control signal. The vehicle 1 may provide a haptic warning to a driver by using the vibrating unit 201. For example, the vehicle 1 may provide various warnings to a driver by vibrating the at least one of the spoke 321 and the handle wheel 322 according to a predetermined risk level when the vehicle 1 changes lanes. In detail, as the risk level increases, an intensity of vibration of the at least one of the spoke 321 and the handle wheel 322 also increases, and thus the vehicle 1 may provide a high level of warning to a driver.

The instrument panel 330 provides a driver with various kinds of information associated with the vehicle 1 such as speed, an engine RPM, a residual fuel quantity, an engine oil temperature, whether an indicator is blinking, and a vehicle traveling distance. The instrument panel 330 may be implemented with a lighting lamp and a scale board and also may be implemented with a display panel depending on the embodiment. When the instrument panel 330 is implemented with a display panel, the instrument panel 330 may display a greater variety of information, such as fuel efficiency, whether various kinds of functions installed in the vehicle 1 are performed, etc., in addition to the above-mentioned information to provide the information to a driver. Also, according to an embodiment, the instrument panel 330 may output different warnings according to a risk level of the vehicle 1 to a driver. In detail, when the vehicle 1 changes lanes, the instrument panel 330 may provide different warnings to a driver according to the predetermined risk level.

A rear-view mirror 340 may be provided at an upper portion of the inside of the vehicle 1, and a driver may view a rear side of the vehicle 1 or the passenger compartment 300 of the vehicle 1 through the rear-view mirror 340.

As described above, at least one imaging device 350 may be provided inside the vehicle 1. While FIG. 2 shows an example in which the imaging device 350 is provided near the rear-view mirror 340. There are no restrictions on the place at which the imaging device 350 is installed. Accordingly, the imaging device 350 may be mounted on any place as long as the imaging device 350 images the inside or outside of the vehicle 1 to acquire image information. The imaging device 350 may capture surrounding images of the vehicle 1 while the vehicle 1 is running or parked, and may detect a pedestrian near the vehicle 1 to acquire location information of the pedestrian.

The imaging device 350 may include at least one camera and may further include a three-dimensional (3D) space recognition sensor, a radar sensor, an ultrasonic sensor, and the like in order to capture a more accurate image.

Example of the 3D space recognition sensor may include a Kinect camera (RGB-D sensor), a time-of-flight (ToF) camera, a stereo camera, or the like, but is not limited thereto. The 3D space recognition sensor may include other devices capable of performing similar functions.

Figure 3:
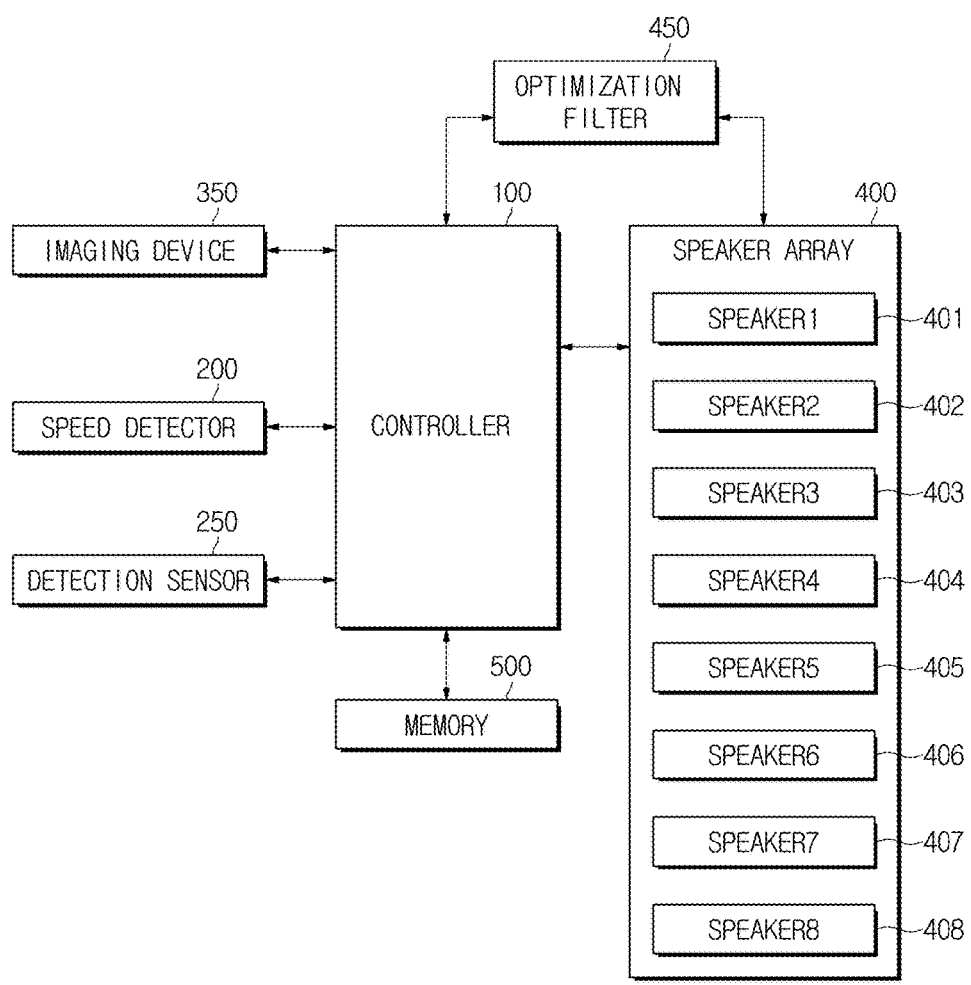
FIG. 3 is a control block diagram of a vehicle according to an embodiment.

FIG. 3 is a control block diagram of a vehicle according to an embodiment.

Referring to FIG. 3, the vehicle 1 according to an embodiment may include the controller 100 configured to control components of the vehicle 1 and generate a control signal for controlling warning sounds output to a pedestrian, a speed detector 200 configured to detect a traveling speed of the vehicle 1, which is driven by a driver, the detection sensor 250 configured to acquire location information of the pedestrian, the imaging device 350 configured to capture surrounding images of the vehicle 1 and detect the pedestrian, a speaker array 400 configured to output the warning sounds in a direction in which the pedestrian is located near the vehicle 1, an optimization filter 450 configured to optimize the control signal generated by the controller 100 so that the warning sounds output by the speaker array 400 are effectively delivered to the pedestrian, and a memory 500 configured to store data associated with the control of the vehicle 1.

The speed detector 200 may detect a traveling speed of the vehicle 1 driven by a driver under control of the controller 100. That is, the speed detector 200 may detect the traveling speed by using a rotational speed of wheels of the vehicle 1. The traveling speed may be expressed in km/h, which indicates a rate of distance (km) covered per unit time (h).

The detection sensor 250 may acquire location information of a pedestrian near the vehicle 1. In detail, the detection sensor 250 may acquire coordinate information regarding the pedestrian with respect to the vehicle 1. The detection sensor 250 may acquire coordination information that varies with movement of the pedestrian in real time and may detect a distance between the vehicle 1 and the pedestrian.

When the detection sensor 250 is implemented with a radar device, the detection sensor 250 may emit millimeter waves or microwaves in a forward direction of the vehicle 1 and receive millimeter waves or microwaves reflected by a pedestrian near the vehicle 1 to acquire location information of the pedestrian.

The detection sensor 250 may deliver the acquired location information of the pedestrian to the controller 100. Also, the detection sensor 250 may acquire the coordinate information that varies with the movement of the pedestrian and the distance between the vehicle 1 and the pedestrian and then deliver the coordinate information and the distance to the controller 100.

As shown in FIGS. 1 and 2, the imaging device 350 may be provided inside the vehicle 1 to image the inside or the outside of the vehicle 1, capture surrounding images of the vehicle 1 while the vehicle 1 is running or parked, and detect a pedestrian near the vehicle 1. Furthermore, the imaging device 350 may acquire location information of the pedestrian. The imaging device 350 may include at least one camera and may further include a 3D space recognition sensor, a radar sensor, an ultrasonic sensor, and the like in order to capture an accurate image of the pedestrian.

The imaging device 350 may capture an image of a pedestrian to acquire coordinate information of the pedestrian with respect to the vehicle 1 and may deliver the acquired coordinate information of the pedestrian to the controller 100.

Since the pedestrian moves near the vehicle 1, coordinates and speed of the pedestrian vary in real time. In addition, since the vehicle 1 also moves, a location and speed of the vehicle 1 vary in real time. The imaging device 350 may capture an image of the pedestrian in real time while the vehicle 1 and the pedestrian are moving and may acquire location information of the pedestrian on the basis of the captured image. The location information of the pedestrian may include a movement speed of the pedestrian and coordination information indicating how far and in which direction the pedestrian is from the vehicle 1.

That is, the imaging device 350 may capture an image of a pedestrian in real time while the vehicle 1 and the pedestrian are moving and may acquire location information of the pedestrian to detect movement and a location of the pedestrian. As described below, since warning sounds may be output only in a direction toward where the pedestrian is moving or in a direction in which the pedestrian is located on the basis of the location information of the pedestrian acquired by the imaging device 350 and the detection sensor 250, it is possible to prevent generation of unnecessary noise due to the outputting of warning sounds even to a place where there are no pedestrians.

The location information of the pedestrian acquired by the imaging device 350 may be stored in the memory 500 and may be used by the controller 100 to generate a control signal for outputting warning sounds to the pedestrian.

The controller 100 may generate a control signal for outputting warning sounds to the pedestrian through the speaker array 400. In detail, the controller 100 may generate a control signal for outputting warning sounds in a direction in which the pedestrian is located on the basis of the location information of the pedestrian acquired by at least one of the detection sensor 250 and the imaging device 350.

In related art, when a pedestrian is detected, the vehicle 1 just outputs warning sounds rather than outputting the warning sounds only to an area where the pedestrian is located, thus causing a problem of unnecessary noise that is generated due to the warning sounds output even to an area where the pedestrian is not present.

The controller 100 according to an embodiment can reduce generation of unnecessary noise by generating a control signal for outputting warning sounds only in a direction in which a pedestrian is located on the basis of location information of the pedestrian acquired by at least one of the detection sensor 250 and the imaging device 350.

Also, the controller 100 may predict a movement route of a pedestrian on the basis of location information of the pedestrian acquired by the detection sensor 250 and may generate a control signal for outputting warning sounds in a direction toward where the pedestrian is moving on the basis of the predicted movement route of the pedestrian.

In detail, the detection sensor 250 may acquire coordination information that varies with the movement of the pedestrian in real time, and the controller 100 may calculate a movement speed of the pedestrian on the basis of the varying coordinate information. That is, the controller 100 may find a distance that the pedestrian moved when the varying coordinate information of the pedestrian is acquired and may calculate a movement speed of the pedestrian on the basis of a time at which the detection sensor 250 acquires the varying coordinate information.

Also, the controller 100 may determine a movement direction of the pedestrian on the basis of the coordinate information that varies with the movement of the pedestrian. That is, since the detection sensor 250 may acquire coordination information that varies with the movement of the pedestrian in real time, the controller 100 may calculate a movement direction of the pedestrian on the basis of the variation in the coordinate information and a vector of coordinates.

The controller 100 may predict a movement route of the pedestrian on the basis of the calculated movement speed of the pedestrian and the determined movement direction of the pedestrian and may generate a control signal for outputting warning sounds in advance in a direction toward where the pedestrian is moving according to at which speed and in which direction the pedestrian is moving.

To this end, the controller 100 may control warning sounds output through the speaker array 400. That is, the controller 100 may perform control so that warning sounds are output not in all directions but only in a predetermined direction through constructive interference and destructive interference between warning sounds output by a plurality of speakers included in the speaker array 400. In this case, the controller 100 may generate a control signal for removing warning sounds output in directions in which there are no pedestrians. As described above, the controller 100 may generate a control signal for removing warning sounds output in directions toward where the pedestrian is not moving on the basis of the movement route of the pedestrian predicted by the controller 100. Since information regarding constructive interference and destructive interference between the warning sounds output by the plurality of speakers included in the speaker array 400 is preset and stored in the memory 500, the controller 100 may generate a control signal for combining the warning sounds output by the plurality of speakers on the basis of the location information of the pedestrian.

The controller 100 may calculate a distance between the vehicle 1 and the pedestrian on the basis of the location information of the pedestrian acquired by at least one of the detection sensor 250 and the imaging device 350 and may determine whether the pedestrian is located within a predetermined distance from the vehicle 1 on the basis of the calculated distance. When the pedestrian is located within the predetermined distance from the vehicle 1, the controller 100 may generate a control signal for outputting warning sounds. When the pedestrian is located beyond the predetermined distance from the vehicle 1 and thus the warning sounds need not be output, the controller 100 may not generate the control signal.

Also, the controller 100 may control intensities of the warning sounds output by the speaker array 400 on the basis of the distance between the vehicle 1 and the pedestrian and may calculate a time-to-collision (TTC) between the vehicle 1 and the pedestrian and control the intensities of the warning sounds output by the speaker array 400 on the basis of a result of the calculation.

TTC refers to a value obtained by measuring a distance between a vehicle 1 being operating and an external vehicle or a pedestrian and dividing the measured distance by relative speed of the two vehicles or the vehicle 1 and the pedestrian. As long as a speed of the vehicle 1 is not changed, the two vehicles or the vehicle 1 and the pedestrian will collide with each other after the calculated TTC.

Accordingly, when the calculated TTC is long, the possibility of collision between the vehicle 1 and the pedestrian is low. Thus, the controller 100 may output warning sounds to the pedestrian at low intensities.

That is, the controller 100 may increase the intensities of the warning sounds when the distance between the vehicle 1 and the pedestrian is short or when the TTC between the vehicle 1 and the pedestrian is short.

When a plurality of pedestrians are located near the vehicle 1, the controller 100 may generate a control signal for outputting warning sounds in directions in which the plurality of pedestrians are respectively located or to an area where the plurality of pedestrians are located. That is, the controller 100 may output warning sounds to each of the plurality of pedestrians or to the entire area where the plurality of pedestrians are included.

Also, the controller 100 may control the intensities of the warning sounds output by the speaker array 400 on the basis of location information of the plurality of pedestrians.

The controller 100 may determine pedestrian distribution density of the area where the plurality of pedestrians are located on the basis of the location information of the pedestrians acquired by the imaging device 350. That is, the controller 100 may determine whether the pedestrian distribution density is high or low by comparing the number of location coordinates in a certain area with predetermined data on the basis of the acquired location information of the pedestrians. After determining the pedestrian distribution density, the controller 100 may control the intensities of the warning sounds output to the area where the pedestrians are located. That is, the controller 100 may output warning sounds to an area with high pedestrian distribution density at high intensities and output warning sounds to an area with low pedestrian distribution density at low intensities.

Also, the controller 100 may predict a movement route of each of the plurality of pedestrians and generate a control signal for outputting warning sounds in a direction toward where each pedestrian is moving on the basis of the predicted movement route.

The controller 100 may be implemented with a memory (not shown) configured to store an algorithm for controlling operations of components in the vehicle 1 or data on a program that represents the algorithm and a processor (not shown) configured to perform the above-mentioned operations using the data stored in the memory. In this case, the memory and the processor may each be implemented with a separate chip. Alternatively, the memory and the processor may be implemented together with one single chip.

The speaker array 400 may output the warning sounds in a direction in which the pedestrian is located on the basis of a control signal generated by the controller 100 and output the warning sounds in a direction toward where the pedestrian is moving on the basis of a movement route of the pedestrian predicted by the controller 100. The speaker array 400 may be provided at the front of the vehicle 1 and include at least one speaker that outputs warning sounds.

While FIG. 3 shows an example in which the speaker array 400 includes eight speakers including first to eighth speakers 400 to 408, there are no restrictions on the number of speakers included in the speaker array 400.

Each of the plurality of speakers included in the speaker array 400 may output the warning sounds, and an output pattern or an output time of the warning sounds may be changed according to a control signal generated by the controller 100. That is, constructive interference and destructive interference may occur between the warning sounds output by the plurality of speakers included in the speaker array 400 because of a phase difference between the warning sounds. Because of the constructive interference and destructive interference, the warning sounds may be output only in a direction in which the pedestrian is located or a direction toward where the pedestrian is moving.

Figure 4:
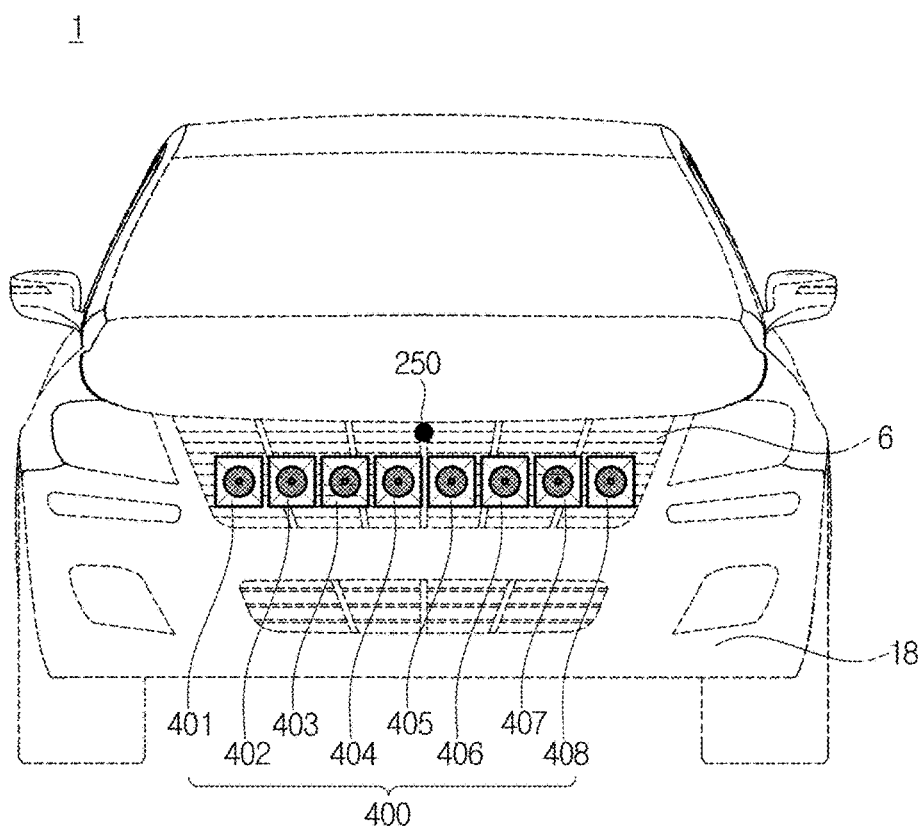
FIG. 4 is a perspective view showing an example in which a speaker array composed of eight speakers is provided at a radiator grill of a vehicle according to an embodiment.
Figure 5:
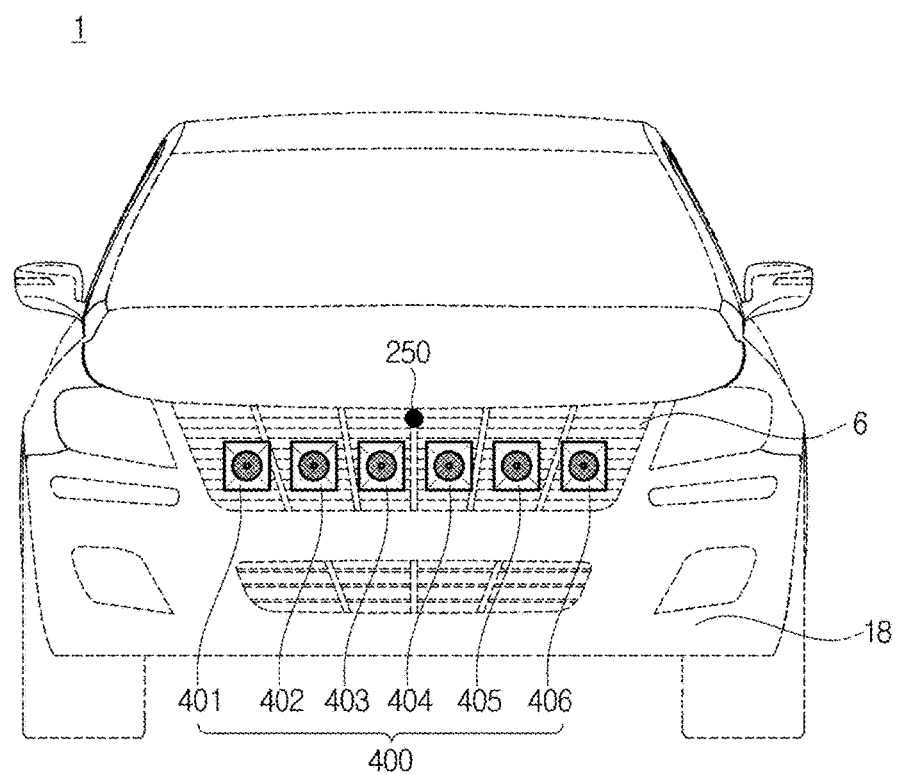
FIG. 5 is a perspective view showing an example in which a speaker array composed of six speakers is provided at a radiator grill of a vehicle according to an embodiment.
Figure 6:
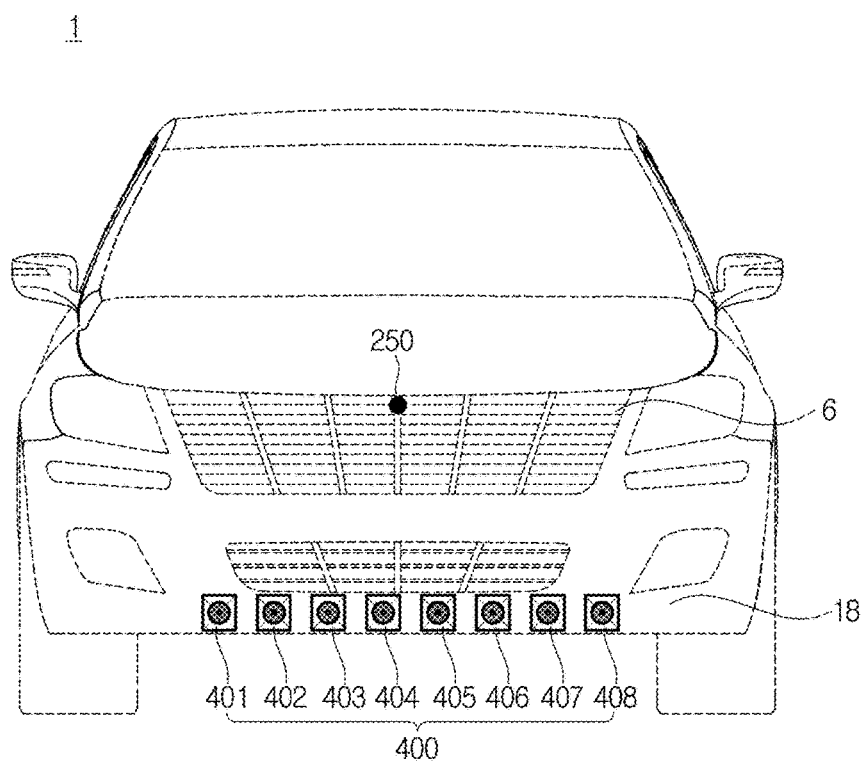
FIG. 6 is a perspective view showing an example in which a speaker array is provided at a lower portion of a front bumper of a vehicle according to an embodiment.
Figure 7:
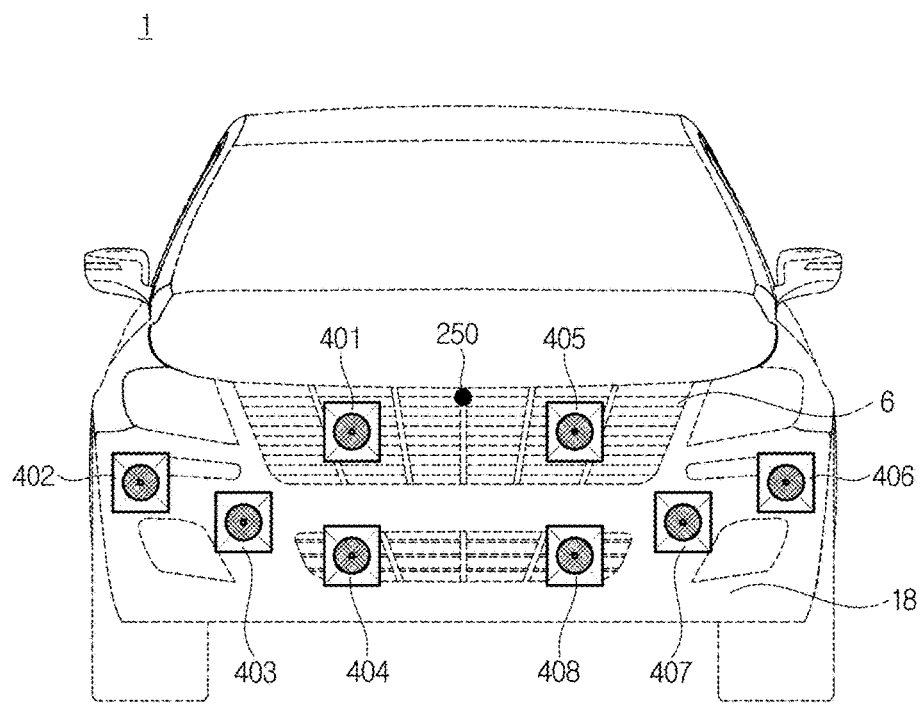
FIGS. 7 and 8 are perspective views each showing an example in which a speaker array is provided at a radiator grill or a front bumper of a vehicle according to an embodiment.
Figure 8:
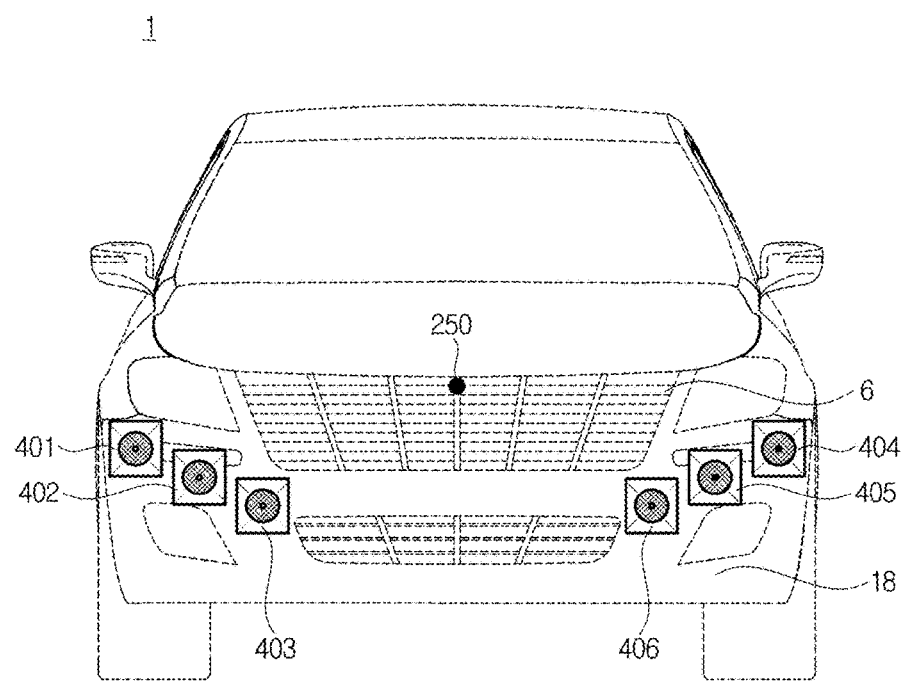

The warning sounds output by the speaker array 400 may be output at the same time using a plurality of beams instead of a simple beep in consideration of the location of the pedestrian and surrounding environments. The speaker array 400 may use the plurality of speakers to output warning sounds to only a designated point or output different warning sounds to a plurality of pedestrians at the same time. Thus, it is possible to reduce noise generated due to unnecessary warning sounds. FIG. 4 is a perspective view showing an example in which a speaker array composed of eight speakers is provided at a radiator grill of a vehicle according to an embodiment, and FIG. 5 is a perspective view showing an example in which a speaker array composed of six speakers is provided at a radiator grill of a vehicle according to an embodiment. FIG. 6 is a perspective view showing an example in which a speaker array is provided at a lower portion of a front bumper of a vehicle according to an embodiment, and FIGS. 7 and 8 are perspective views each showing an example in which a speaker array is provided at a radiator grill or a front bumper of a vehicle according to an embodiment.

Referring to FIG. 4, the speaker array 400 may be provided at the radiator grill 6 of the vehicle 1. That is, the speaker array 400 may be composed of first to eighth speakers 401 to 408. As shown in FIG. 4, the plurality of speakers 401 to 408 may be arranged in a row or other shapes. An arrangement interval of the plurality of speakers may be different according to various embodiments that are implemented. The plurality of speakers may be provided at the front of the radiator grill 6 to output warning sounds in a forward direction of the vehicle 1.

Each of the plurality of speakers included in the speaker array 400 may output warning sounds under control of the controller 100, and constructive interference or destructive interference may occur between the warning sounds output by the plurality of speakers according to a control signal generated by the controller 100. Also, intensities of the warning sounds output by the plurality of speakers may increase or decrease under control of the controller 100.

While a pedestrian is walking, the pedestrian can hear the warning sounds output from the speaker array 400 provided in the vehicle 1 and notice the approach of the vehicle 1.

The number of speakers included in the speaker array 400 may be eight as shown in FIG. 4 or six as shown in FIG. 5. There are no restrictions on the number of speakers constituting the speaker array 400, and there may be various embodiments depending on a method of combining the warning sounds output by the speakers.

Referring to FIG. 6, the speaker array 400 may be provided at a lower portion of the front bumper 18 of the vehicle 1. That is, the speaker array 400 may be composed of first to eighth speakers 401 to 408. As shown in FIG. 6, the plurality of speakers 401 to 408 may be arranged in a row or other shapes. An arrangement interval of the plurality of speakers may be different according to various embodiments. The plurality of speakers may be provided at the lower portion of the front bumper 18 to output warning sounds in a forward direction of the vehicle 1.

Although not shown in FIG. 6, the number of speakers included in the speaker array 400 that are provided at the lower portion of the front bumper 18 of the vehicle 1 may be eight as shown in FIG. 6 or six in another case. There are no restrictions on the number of speakers constituting the speaker array 400 provided at the lower portion of the front bumper 18 of the vehicle 1, and there may be various embodiments depending on a method of combining the warning sounds output by the speakers.

The speaker array 400 may be provided at the front bumper 18 or the radiator grill 6 of the vehicle 1. That is, as shown in FIG. 7, three speakers of the speaker array 400 may be provided at a lower right portion of the front bumper 18, three speakers of the speaker array 400 may be provided at a lower left portion of the front bumper, and two speakers of the speaker array 400 may be provided at the radiator grill 6.

Alternatively, as shown in FIG. 8, three speakers of the speaker array 400 may be provided at a lower right portion of the front bumper 18, three speakers of the speaker array 400 may be provided at a lower left portion of the front bumper 18, and no speakers may be provided at the radiator grill 6.

The plurality of speakers included in the speaker array 400 provided at the front bumper 18 or the radiator grill 6 may be arranged in a row or other shapes. Also, the plurality of speakers may have a different arrangement interval and arrangement shape according to various embodiments and may output warning sounds in a forward direction of the vehicle 1.

As shown in FIG. 7, by placing some of the plurality of speakers at the front bumper 18 and the others at the radiator grill 6, the controller 100 may generate a control signal for enabling constructive interference and destructive interference to occur between the warning sounds output by the speakers.

Referring to FIG. 3 again, the optimization filter 450 may optimize a control signal generated by the controller 100 so that the warning sounds output by the speaker array 400 are efficiently delivered to a pedestrian. That is, the controller 100 generates a control signal for enabling the speaker array 400 to output the warning sounds only in a direction toward where the pedestrian is moving or a direction in which the pedestrian is located. The control signal enables constructive interference to occur between the warning sounds output in the direction in which the pedestrian is located and also enables destructive interference to occur between warning sounds output in directions in which there are no pedestrians.

In this case, when the controller 100 generates a control signal for enabling constructive interference to occur between the warning sounds output in the direction in which the pedestrian is located, destructive interference does not occur between the warning sounds output in the directions in which there are no pedestrians, and thus the warning sounds may still be present. On the other hand, when the controller 100 generates a control signal to enable destructive interference to occur between the warning sounds output in the directions in which there are no pedestrians, constructive interference does not occur between the warning sounds output in the direction in which the pedestrian is located, and thus the warning sounds may be weakened. This is the same in the case in which warning sounds are output in a direction toward where the pedestrian is moving.

On the basis of an optimization algorithm for a control signal generated by the controller 100, the optimization filter 450 may optimize the control signal generated by the controller 100 so that constructive interference occurs without destruction between the warning sounds output in the direction toward where the pedestrian is moving or in the direction in which the pedestrian is located and may optimize the control signal generated by the controller 100 so that destructive interference occurs without construction between the warning sounds output in the directions in which there are no pedestrians.

The memory 500 may store data associated with control of the vehicle 1 according to an embodiment. That is, the memory 500 may store the location information of the pedestrian acquired by the imaging device 350 and may store data associated with the control signal that is generated by the controller 100 to output the warning sounds in the direction toward where the pedestrian is moving or in the direction in which the pedestrian is located.

Also, the memory 500 may store data regarding the distance between the vehicle 1 and the pedestrian that is calculated by the controller 100, data regarding the predetermined distance between the vehicle 1 and the pedestrian in order to output warning sounds, and data regarding a TTC between the vehicle 1 and the pedestrian that is calculated by the controller 100.

The memory 500 may store data regarding intensities of the warning sounds that are output by the speaker array 400 on the basis of the distance between the vehicle 1 and the pedestrian and also may store data regarding intensities of the warning sounds output by the speaker array 400 on the basis of the TTC between the vehicle 1 and the pedestrian.

The memory 500 may be implemented with at least one of a non-volatile memory device such as a cache, a read-only memory (ROM), a programmable ROM, an erasable programmable ROM (EPROM), an electrically erasable programmable ROM (EEPROM), a flash memory, a volatile memory device such as a random access memory (RAM), and a storage medium such as a hard disk drive (HDD) and a CD-ROM, etc., but is not limited thereto. The memory 500 may be a memory that is implemented with a separate chip different from that of the processor that has been described in association with the controller. Alternatively, the memory and the processor may be implemented together with one single chip.

Figure 9:
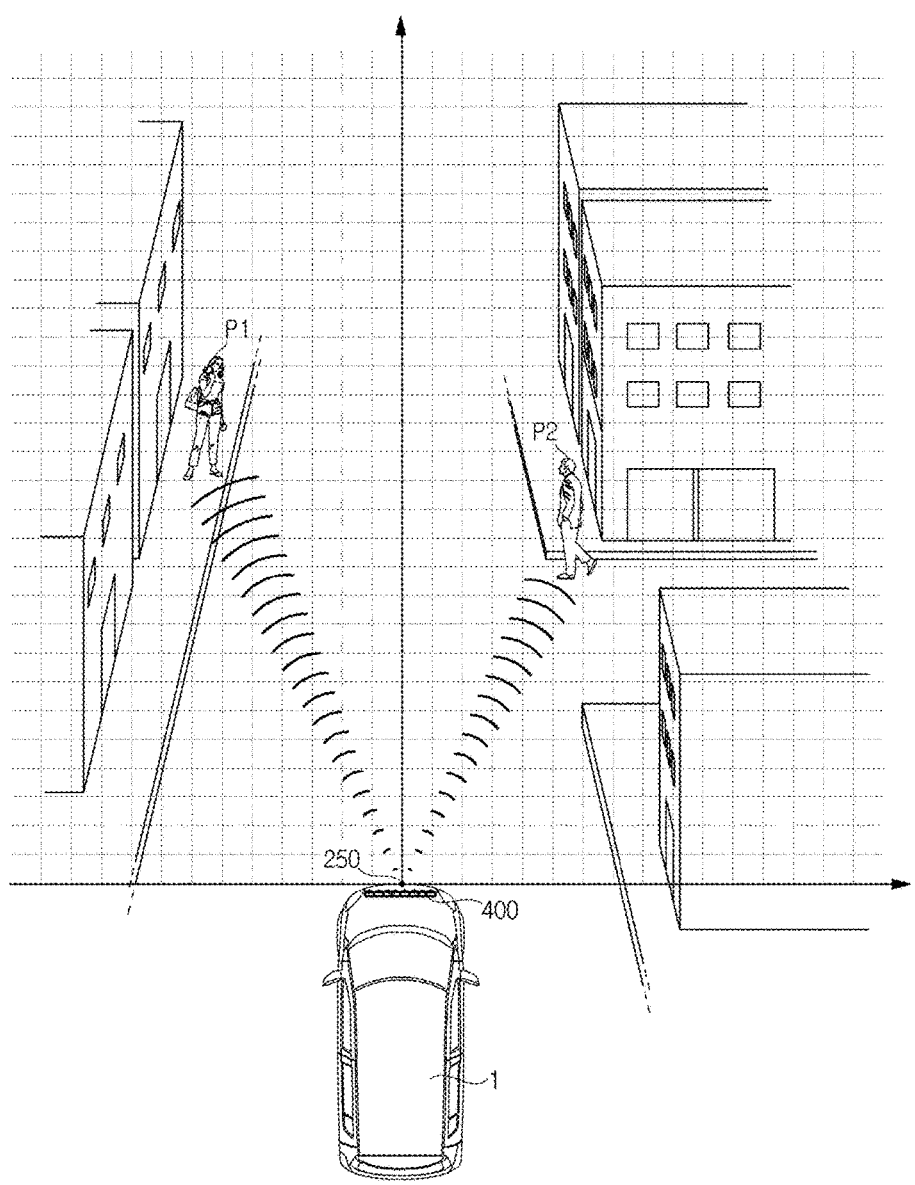
FIG. 9 is a conceptual view showing an example in which a detection sensor acquires location information of a pedestrian according to an embodiment.

FIG. 9 is a conceptual view showing an example in which a detection sensor acquires location information of a pedestrian according to an embodiment.

As shown in FIG. 9, the detection sensor 250 of the vehicle 1 may acquire location information of a pedestrian. In this case, the detection sensor 250 may acquire coordinate information of the pedestrian with respect to the vehicle 1.

The detection sensor 250 may acquire coordinate information of a plurality of pedestrians. Referring to FIG. 9, when there are two pedestrians, the detection sensor 250 may acquire coordinate information of a first pedestrian P1 and a second pedestrian P2 with reference to a current location of the vehicle 1 while the vehicle 1 is traveling. The coordinate information of the plurality of pedestrians acquired by the detection sensor 250 may be delivered to the controller 100 and stored in the memory 500.

Also, when coordinates and speed of a pedestrian near the vehicle 1 vary with movement of the pedestrian in real time, the detection sensor 250 may acquire coordinate information of the pedestrian in real time and may update location information of the pedestrian in real time on the basis of the acquired coordinate information.

Also, the controller 100 may determine pedestrian distribution density of an area where the plurality of pedestrians are located on the basis of location information of the pedestrians acquired by the detection sensor 250. While FIG. 9 shows an example in which coordinate information of the first and second pedestrians P1 and P2 is acquired, the detection sensor 250 may acquire location information of a plurality of pedestrians when the plurality of pedestrians are present. The controller 100 may determine whether distribution density of the plurality of pedestrians is high or low by comparing the number of location coordinates in a certain area with predetermined data on the basis of the location information of the plurality of pedestrians acquired by the detection sensor 250.

FIGS. 10 and 11 are conceptual views each showing an example of predicting a movement route of a pedestrian and outputting warning sounds according to an embodiment, and FIG. 12 is a conceptual view showing an example of predicting a movement route of a pedestrian and outputting warning sounds when there is an obstacle according to an embodiment.

Referring to FIG. 10, the controller 100 may predict a movement route of a pedestrian on the basis of location information of the pedestrian acquired by the detection sensor 250 and may generate a control signal for outputting warning sounds in a direction toward where the pedestrian is moving on the basis of the predicted movement route of the pedestrian.

As shown in FIG. 10, when a pedestrian P1 starts moving at point a1, the imaging device 350 of the vehicle 1 may capture an image of the pedestrian P1, detect the pedestrian P1, and acquire location coordinates of the pedestrian P1.

In addition, the detection sensor 250 of the vehicle 1 may acquire location information of the pedestrian P1, and may acquire the location information of the pedestrian P1 that varies with the movement of the pedestrian P1 in real time and a distance between the vehicle 1 and the pedestrian P1.

The location information of the pedestrian P1 that varies while the pedestrian P1 moves from point a1 to point a7 may be acquired by at least one of the detection sensor 250 and the imaging device 350 and delivered to the controller 100. The controller 100 may calculate a movement speed of the pedestrian on the basis of the varying coordinate information of the pedestrian P1. That is, when the controller 100 acquires the coordination information that varies while the pedestrian P1 moves from point a1 to point a7, the controller 100 may calculate a movement distance of the pedestrian P1 in real time and may calculate the movement speed of the pedestrian P1 on the basis of a time required to cover the movement distance of the pedestrian P1.

Also, according to the coordinate information that varies with the movement of the pedestrian P1, the controller 100 may determine a movement direction of the pedestrian P1 and may predict a movement route of the pedestrian P1 on the basis of the calculated movement speed of the pedestrian P1.

The detection sensor 250 may acquire the location information of the pedestrian P1 in real time while the pedestrian P1 moves from point a1 to point a7, and the controller 100 may predict that the pedestrian P1 will move from point a7 to point a8 on the basis of the movement speed and the movement direction of the pedestrian P1. That is, the controller 100 may predict that the movement route of the pedestrian P1 is from point a1 to point a8.

The controller 100 may generate a control signal for outputting warning sounds W to point a8 to which the pedestrian P1 is moving on the basis of the predicted movement route of the pedestrian P1, and the speaker array 400 may output the warning sounds W to point a8 to which the pedestrian P1 is moving on the basis of the generated control signal.

That is, as shown in FIG. 10, when the pedestrian P1 jaywalks across a road, the controller 100 may predict the movement route of the pedestrian P1 and output the warning sounds W to a point to which the pedestrian P1 will move in advance, thus preventing progress of the pedestrian P1.

Also, even though the pedestrian P1 does not arrive at point a8, the controller 100 may generate a control signal for outputting the warning sounds W in a direction in which the pedestrian P1 will be located while the pedestrian P1 moves from point a1 to point a7, and the speaker array 400 may output the warning sounds W only in the direction in which the pedestrian P1 will be located.

Referring to FIG. 11, when a pedestrian enters a road from a sidewalk, the controller 100 may predict a movement route of the pedestrian on the basis of location information of the pedestrian acquired by the detection sensor 250 and may generate a control signal for outputting the warning sounds W in a direction toward where the pedestrian is moving on the basis of the predicted movement route of the pedestrian.

As shown in FIG. 11, when a pedestrian P1 starts walking at point b1, the imaging device 350 of the vehicle 1 may capture an image of the pedestrian P1 and detect the pedestrian P1 and may acquire location coordinates of the pedestrian P1.

In addition, the detection sensor 250 of the vehicle 1 may acquire location information of the pedestrian P1 and may acquire location information of the pedestrian P1 that varies with movement of the pedestrian P1 in real time and a distance between the vehicle 1 and the pedestrian P1.

Location information of the pedestrian P1 that varies while the pedestrian P1 moves from point b1 to point b7 may be acquired by at least one of the detection sensor 250 and the imaging device 350 and delivered to the controller 100. The controller 100 may calculate a movement speed of the pedestrian on the basis of the varying coordinate information of the pedestrian P1. That is, when the controller 100 acquires the coordination information that varies while the pedestrian P1 moves from point b1 to point b7, the controller 100 may calculate a movement distance of the pedestrian P1 in real time and may calculate the movement speed of the pedestrian P1 on the basis of a time required to cover the movement distance of the pedestrian P1.

Also, according to the coordinate information that varies with the movement of the pedestrian P1, the controller 100 may determine a movement direction of the pedestrian P1 and may predict a movement route of the pedestrian P1 on the basis of the calculated movement speed of the pedestrian P1.

The detection sensor 250 may acquire the location information of the pedestrian P1 in real time while the pedestrian P1 moves from point b1 to point b7, and the controller 100 may predict that the pedestrian P1 will move from point b7 to point b8 on the basis of the movement speed and the movement direction of the pedestrian P1. That is, the controller 100 may predict that the movement route of the pedestrian P1 is from point b1 to point b8.

The controller 100 may generate a control signal for outputting the warning sounds W to point b8 to which the pedestrian P1 is moving on the basis of the predicted movement route of the pedestrian P1, and the speaker array 400 may output the warning sounds W to point b8 to which the pedestrian P1 is moving on the basis of the generated control signal.

That is, as shown in FIG. 11, when the pedestrian P1 enters a road from a sidewalk, the controller 100 may predict a movement route of the pedestrian P1 and output the warning sounds W to a point to which the pedestrian P1 will move in advance, thus preventing progress of the pedestrian P1.

Also, even though the pedestrian P1 does not arrive at point b8, the controller 100 may generate a control signal for outputting the warning sounds W in a direction in which the pedestrian P1 will be located while the pedestrian P1 moves from point b1 to point b2, and the speaker array 400 may output the warning sounds W only in the direction in which the pedestrian P1 will be located.

Referring to FIG. 12, when a pedestrian that was hidden by another vehicle 3 suddenly enters a road, the controller 100 may predict a movement route of the pedestrian on the basis of location information of the pedestrian acquired by the detection sensor 250 and may generate a control signal for outputting the warning sounds W in a direction toward where the pedestrian is moving the basis of the predicted movement route of the pedestrian.

That is, when a pedestrian is hidden by an obstacle while a movement route of the pedestrian is tracked, the controller 100 may continuously predict the movement of the pedestrian on the basis of location information, including speed information and direction information, of the pedestrian that has been acquired before the pedestrian is hidden by the obstacle.

As shown in FIG. 12, when a pedestrian P1 starts walking at point c1, the imaging device 350 of the vehicle 1 may capture an image of the pedestrian P1, detect the pedestrian P1, and acquire location coordinates of the pedestrian P1. However, as shown in FIG. 12, when the pedestrian P1 is hidden by the vehicle 3, the imaging device 350 of the vehicle 1 cannot capture an image of the pedestrian P1 and thus may not acquire location information corresponding to the movement of the pedestrian P1.

However, the detection sensor 250 of the vehicle 1 may acquire the location information of the pedestrian P1. That is, even when the pedestrian is hidden by the vehicle 3, the detection sensor 250 may detect the pedestrian P1 and also more accurately recognize movement of the pedestrian P1. Accordingly, the detection sensor 250 may acquire location information of the pedestrian P1 that varies with the movement of the pedestrian P1 in real time and a distance between the vehicle 1 and the pedestrian P1.

Location information of the pedestrian P1 that varies while the pedestrian P1 moves from point c1 to point c7 past the front of the vehicle 3 may be acquired by the detection sensor 250 and delivered to the controller 100. The controller 100 may calculate a movement speed of the pedestrian on the basis of the varying coordinate information of the pedestrian P1. That is, when the controller 100 acquires the coordination information that varies while the pedestrian P1 moves from point c1 to point c7, the controller 100 may calculate a movement distance of the pedestrian P1 in real time and may calculate the movement speed of the pedestrian P1 on the basis of a time required to cover the movement distance of the pedestrian P1.

Also, according to the coordinate information that varies with the movement of the pedestrian P1, the controller 100 may determine a movement direction of the pedestrian P1 and may predict a movement route of the pedestrian P1 on the basis of the calculated movement speed of the pedestrian P1.

The detection sensor 250 may acquire the location information of the pedestrian P1 in real time while the pedestrian P1 moves from point c1 to point c7. Even when a driver of the vehicle 1 cannot recognize the presence of the pedestrian P1 hidden by the vehicle 3 while the pedestrian P1 moves from point c1 to point c7, the controller 100 may predict that the pedestrian P1 will move from point c7 to point c8 on the basis of the movement speed and the movement direction of the pedestrian P1. That is, the controller 100 may predict that the movement route of the pedestrian P1 is from point c1 to point c8.

The controller 100 may generate a control signal for the outputting warning sounds W to point c8 to which the pedestrian P1 is moving on the basis of the predicted movement route of the pedestrian P1, and the speaker array 400 may output the warning sounds W to point b8 to which the pedestrian P1 is moving on the basis of the generated control signal.

That is, as shown in FIG. 12, when the pedestrian P1 enters a road from a sidewalk, the controller 100 may predict the movement route of the pedestrian P1 and output the warning sounds W to a point to which the pedestrian P1 will move, in advance, thus preventing progress of the pedestrian P1.

Also, even though the pedestrian P1 does not arrive at point c8, the controller 100 may generate a control signal for outputting the warning sounds W in a direction in which the pedestrian P1 will be located while the pedestrian P1 moves from point c1 to point c7, and the speaker array 400 may output the warning sounds W only in the direction in which the pedestrian P1 will be located.

Figure 13:
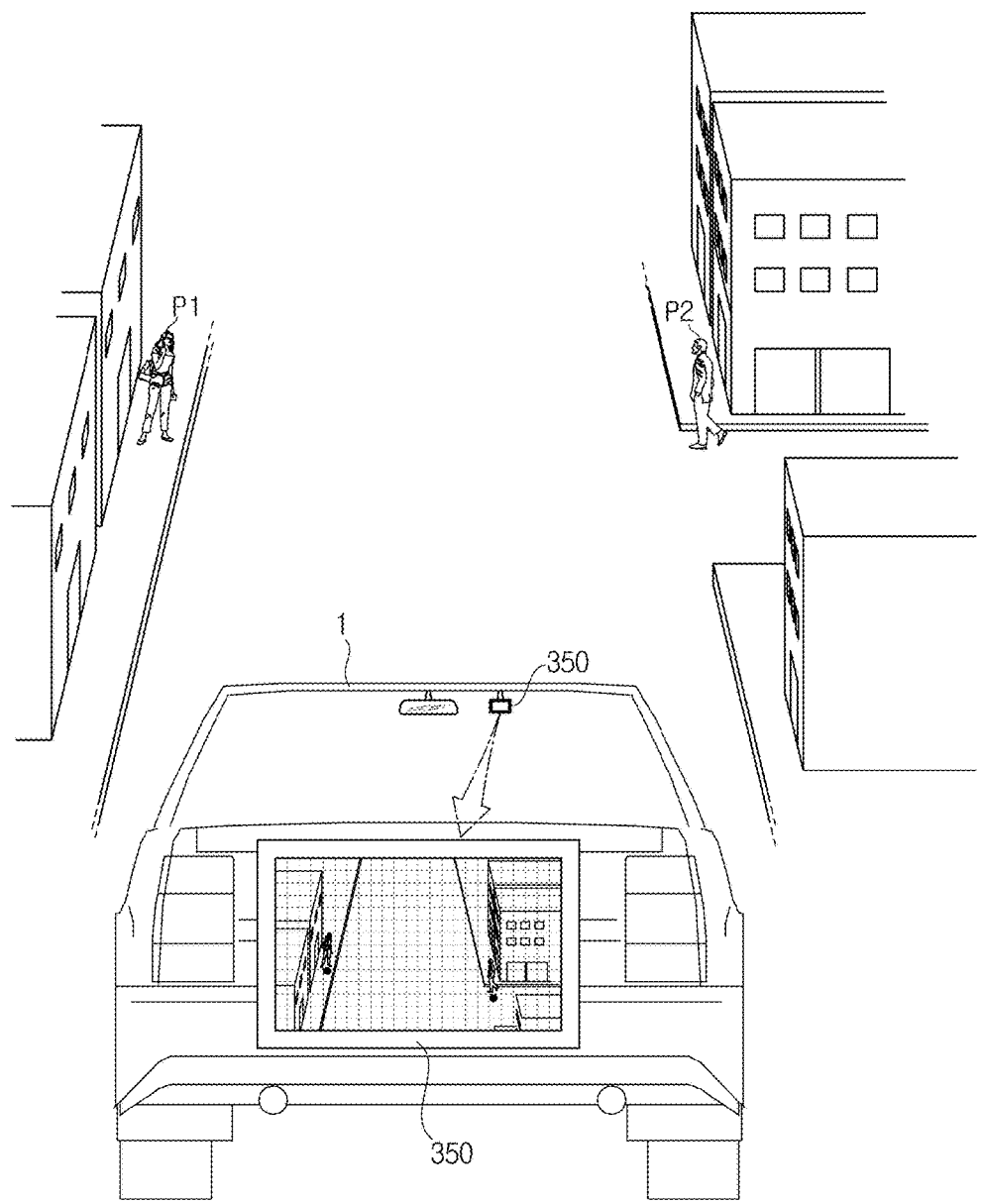
FIG. 13 is a conceptual view showing an example of acquiring location information of a pedestrian on the basis of an image obtained by imaging a pedestrian according to an embodiment.

FIG. 13 is a conceptual view showing an example of acquiring location information of a pedestrian on the basis of an image obtained by imaging a pedestrian according to an embodiment.

As shown in FIG. 13, the imaging device 350 of the vehicle 1 may capture an image of a pedestrian, detect the pedestrian, and acquire location coordinates of the pedestrian. In this case, the imaging device 350 may acquire coordinate information of the pedestrian with respect to the vehicle 1.

The imaging device 350 may acquire coordination information of a plurality of pedestrians. Referring to FIG. 13, when there are two pedestrians, the imaging device 350 may acquire coordinate information of a first pedestrian P1 and a second pedestrian P2 with respect to a current location of the vehicle while the vehicle 1 is traveling. The coordinate information of the plurality of pedestrians acquired by the imaging device 350 may be delivered to the controller 100 and stored in the memory 500.

Figure 14:
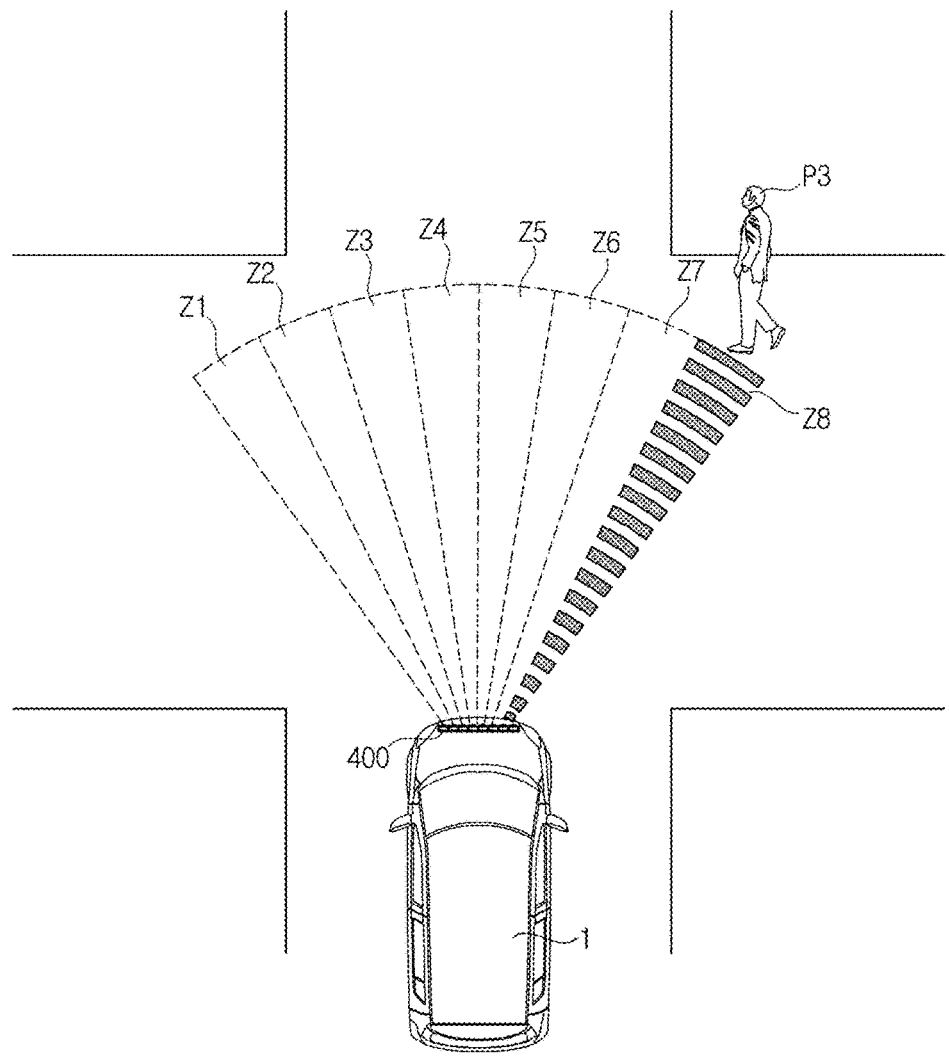
FIG. 14 is a conceptual view showing an example in which a speaker array outputs warning sounds to a pedestrian according to an embodiment.
Figure 15:
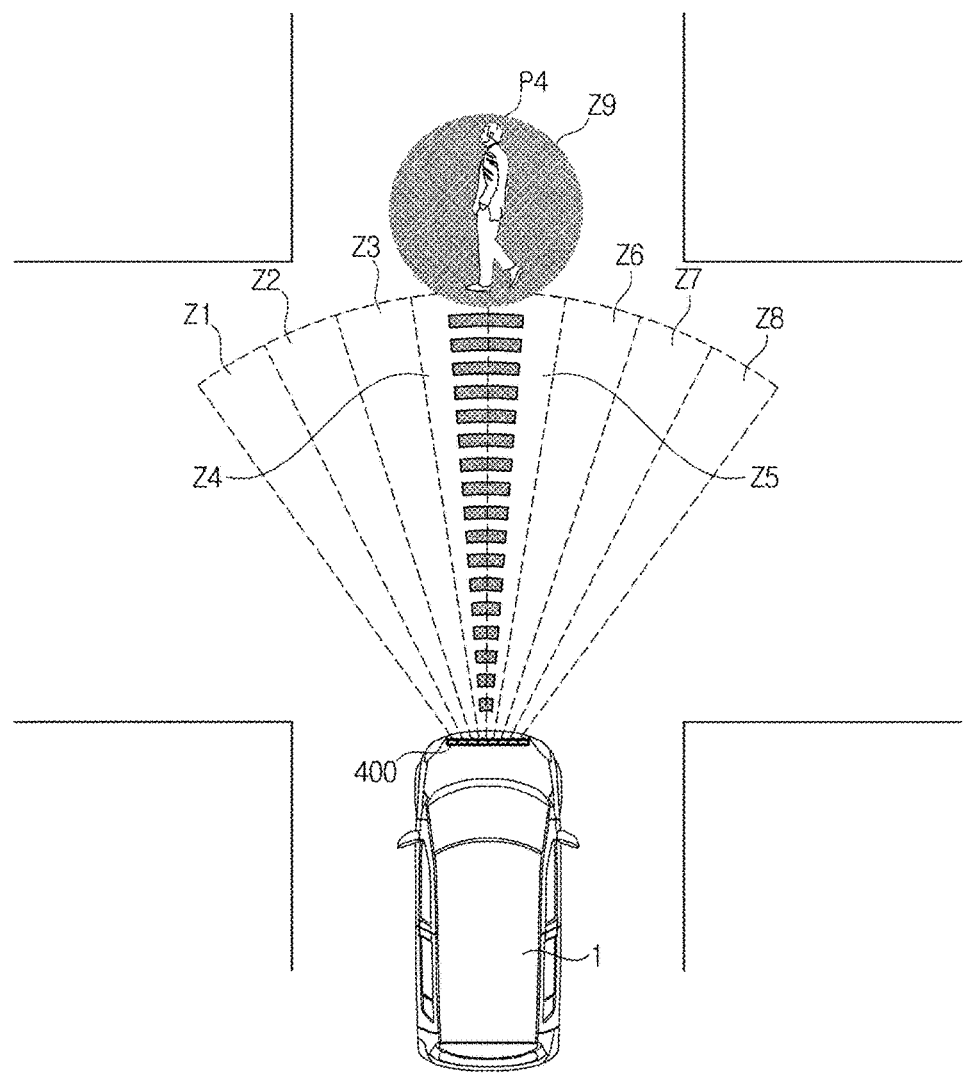
FIG. 15 is a conceptual view showing an example in which a speaker array outputs warning sounds to an area within a predetermined distance from a pedestrian according to an embodiment.

Also, when coordinates and speed of a pedestrian near the vehicle 1 vary with movement of the pedestrian in real time, the imaging device 350 may capture an image of the pedestrian in real time and may update location information of the pedestrian in real time on the basis of the captured image. FIG. 14 is a conceptual view showing an example in which a speaker array outputs warning sounds to a pedestrian according to an embodiment, and FIG. 15 is a conceptual view showing an example in which a speaker array outputs warning sounds to an area within a predetermined distance from a pedestrian according to an embodiment.

Referring to FIG. 14, the imaging device 350 may capture an image of a pedestrian P3 and acquire location information of the pedestrian P3, and the controller 100 may generate a control signal for outputting warning sounds only in a direction in which the pedestrian P3 is located on the basis of the acquired location information of the pedestrian P3.

That is, the imaging device 350 may acquire coordinate information of the pedestrian P3 on the basis of a location of the vehicle 1, and the controller 100 may calculate a distance between the vehicle 1 and the pedestrian P3 on the basis of the acquired coordinate information of the pedestrian P3. When the calculated distance between the vehicle 1 and the pedestrian P3 is less than or equal to a predetermined distance, the controller 100 may generate a control signal for outputting warning sounds only in the direction in which the pedestrian P3 is located.

Referring to FIG. 14, the speaker array 400 may output warning sounds in a forward direction of the vehicle 1. In this case, unnecessary noise may be generated when the warning sounds are also output in directions in which the pedestrian P3 is not located. Accordingly, the controller 100 may generate a control signal for outputting warning sounds only in a direction Z8 in which the pedestrian P3 is located rather than in directions Z1 to Z7 in which the pedestrian P3 is not located.

In order to output the warning sounds only in the direction in which the pedestrian P3 is located, the controller 100 may control warning sounds output by the plurality of speakers included in the speaker array 400.

That is, as described above, by combining control signals for the warning sounds output by the plurality of speakers to enable destructive interference to occur between the warning sounds output in the directions Z1 to Z7 in which the pedestrian P3 is not located so that the warning sounds may be removed and enable constructive interference to occur between the warning sounds output in the direction Z8 in which the pedestrian P3 is located so that the warning sounds may be amplified, it is possible to effectively output the warning sounds in the direction Z8 in which the pedestrian P3 is located.

Data regarding the combination of the control signals in order to output the warning sounds only in the direction Z8 in which the pedestrian P3 is located rather than in directions Z1 to Z7 in which the pedestrian P3 is not located may be preset and stored in the memory 500.

As shown in FIG. 14, since the speaker array 400 provided in the vehicle 1 may output warning sounds only in the direction Z8 in which the pedestrian P3 is located rather than in directions Z1 to Z7 in which the pedestrian P3 is not located, it is possible to inform only the pedestrian P3 about the approach of the vehicle 1 and also reduce generation of unnecessary noise in the directions Z1 to Z7 where the pedestrian P3 is not located.

Referring to FIG. 15, the controller 100 may generate a control signal for outputting warning sounds in an area within a predetermined distance from a pedestrian P4 on the basis of location information of the pedestrian P4 acquired by the imaging device 350. That is, the controller 100 may generate a control signal for enabling the speaker array 400 to output warning sounds to an area surrounding the pedestrian in consideration of surrounding environments and ambient noise as well as generating a control signal for enabling the speaker array 400 to output the warning sounds only in the direction in which the pedestrian is located.

As shown in FIG. 15, the controller 100 may generate a control signal for outputting warning sounds in an area Z9 within a predetermined distance from the pedestrian P4 on the basis of the location information of the pedestrian P4 acquired by the imaging device 350, and the speaker array 400 may output the warning sounds to the area surrounding the pedestrian P4 as well as in the direction in which the pedestrian P4 is located.

The area Z9 within the predetermined distance from a location of the pedestrian P4 is an area that is set on the basis of data pre-stored in the memory, and the area may be larger or smaller depending on the case.

Other pedestrians located adjacent to the pedestrian P4 may become aware of the warning sounds and also may be less affected by ambient noise due to the outputting of the warning sounds even to the area Z9 within the predetermined distance from the location of the pedestrian P4.

Figure 16:
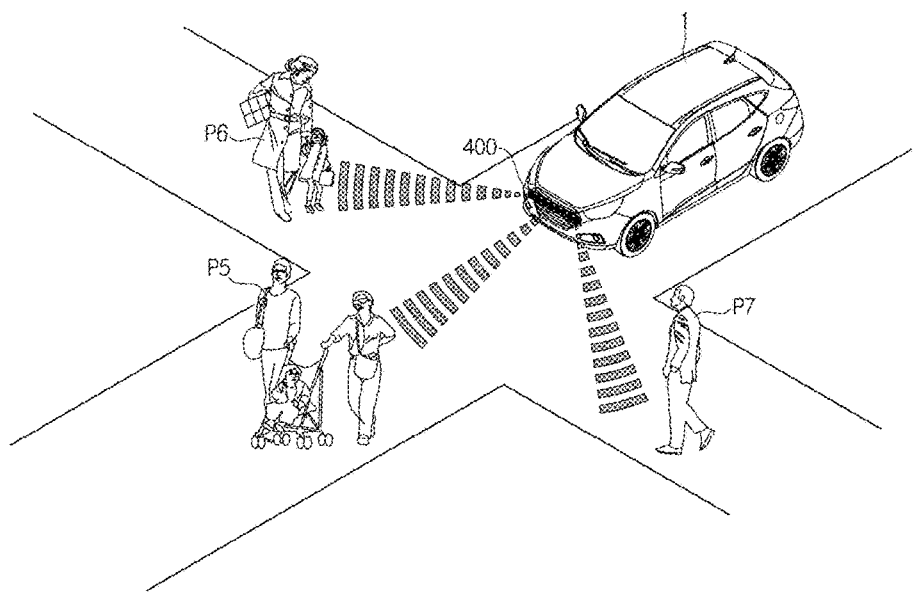
FIG. 16 is a conceptual view showing an example in which a speaker array outputs warning sounds to a plurality of pedestrians according to an embodiment.
Figure 17:
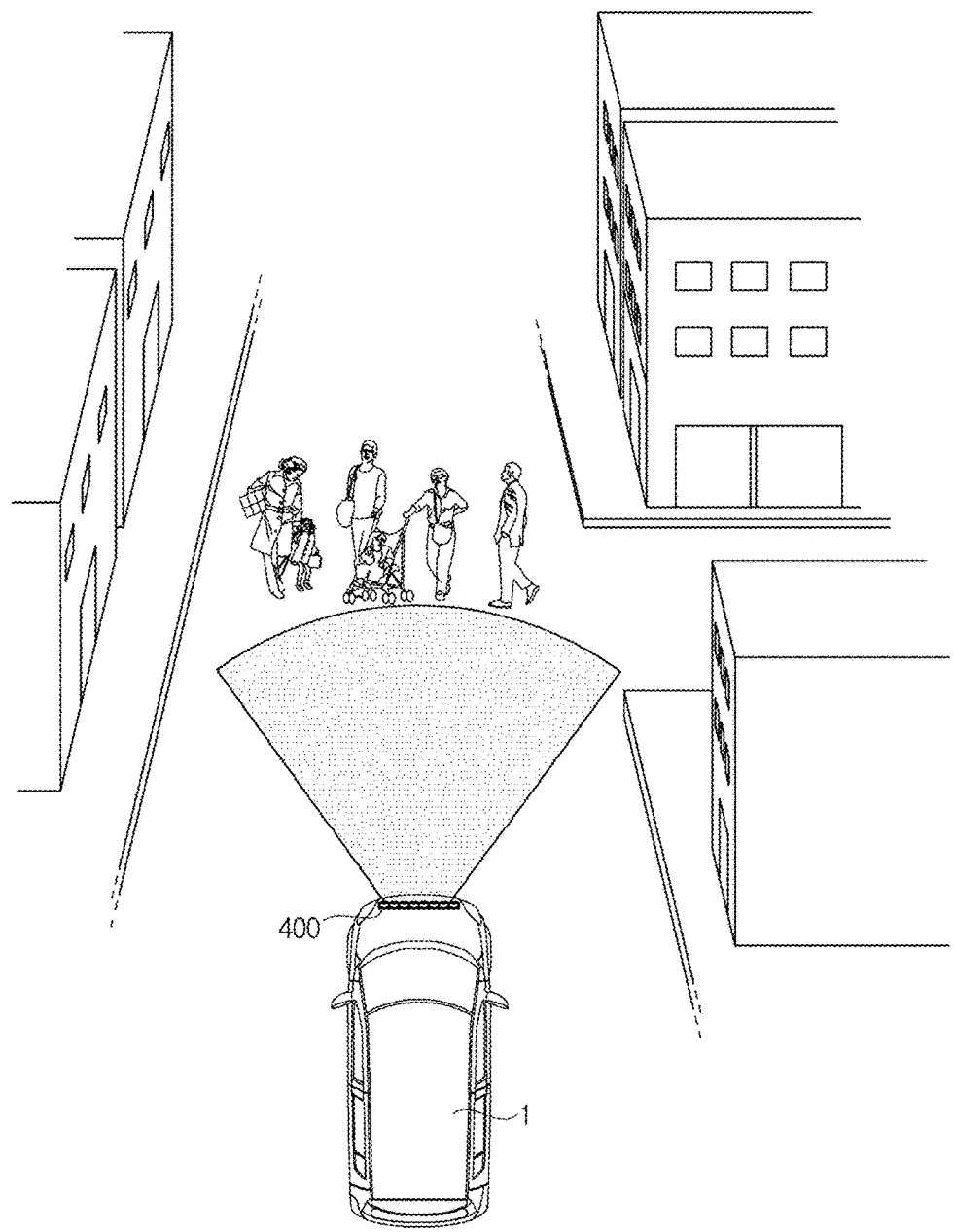
FIG. 17 is a conceptual view showing an example in which a speaker array outputs warning sounds to the entirety of a designated area.

FIG. 16 is a conceptual view showing an example in which a speaker array outputs warning sounds to a plurality of pedestrians according to an embodiment, and FIG. 17 is a conceptual view showing an example in which a speaker array outputs warning sounds to the entirety of a designated area.

Referring to FIG. 16, the imaging device 350 may capture an image of a plurality of pedestrians P5, P6, and P7 and acquire location information of the pedestrians P5, P6, and P7, and the controller 100 may generate a control signal for outputting warning sounds only in directions in which the pedestrians P5, P6, and P7 are located on the basis of the acquired location information of the pedestrians P5, P6, and P7.

That is, the imaging device 350 may acquire coordinate information of the plurality of pedestrians P5, P6, and P7 with respect to a location of the vehicle 1, and the controller 100 may calculate distances between the vehicle 1 and the pedestrians P5, P6, and P7 on the basis of the acquired coordinate information of the pedestrians P5, P6, and P7. When the calculated distances between the vehicle 1 and the pedestrians P5, P6, and P7 are less than or equal to a predetermined distance, the controller 100 may generate a control signal for outputting warning sounds only in the directions in which the pedestrians P5, P6, and P7 are located.

As shown in FIG. 16, the controller 100 may output warning sounds only in the directions in which the plurality of pedestrians P5, P6, and P7 are located rather than in directions in which the plurality of pedestrians P5, P6, and P7 are not located, thus informing only the pedestrians P5, P6, and P7 about the approach of the vehicle 1 and also reducing generation of unnecessary noise in the directions in which the pedestrians P5, P6, and P7 are not located.

The controller 100 may calculate distances between the vehicle 1 and the plurality of pedestrians P5, P6, and P7 and may control intensities of the warning sounds output by the speaker array 400 on the basis of the calculated distances. That is, the controller 100 may increase intensities of warning sounds output to a pedestrian close to the vehicle 1 among the plurality of pedestrians P5, P6, and P7 and may decrease intensities of warning sounds output to a pedestrian far from the vehicle 1.

Also, although not shown, the controller 100 may control intensities of the warning sounds output by the speaker array 400 when the pedestrian approach the vehicle 1. That is, the controller 100 may acquire a distance between the moving pedestrian and the vehicle 1 in real time on the basis of the location information of the pedestrian acquired by the imaging device 350 or the detection sensor 250 and may increase the intensities of the warning sounds output by the speaker array 400 on the basis of the acquired distance when the pedestrian approaches the vehicle 1.

Accordingly, on the basis of the location information of the pedestrian acquired in real time, the controller 100 may decrease the intensities of the warning sounds output by the speaker array 400 when the pedestrian moves away from the vehicle 1 and may increase the intensities of the warning sounds output by the speaker array 400 when the pedestrian moves toward the vehicle 1.

Likewise, the controller 100 may control frequencies of the warning sounds output by the speaker array 400 on the basis of the distance between the vehicle 1 and the pedestrian.

Also, when a pedestrian is located near the vehicle 1 while the vehicle 1 is traveling, the controller 100 may differently control intensities of warning sounds for a pedestrian being walking on the right side of the vehicle 1 with respect to the traveling direction of the vehicle 1 and intensities of warning sounds for a pedestrian being walking on the left side of the vehicle 1.

Referring to FIGS. 11 and 12, a pedestrian who is walking on the right side with respect to a traveling direction of the vehicle 1 that is traveling on the right lane as shown in FIG. 11 is farther from the vehicle 1 than a pedestrian who is walking on the left side of the vehicle 1 as shown in FIG. 12.

That is, the controller 100 may acquire location information of the pedestrian walking on the right side of the vehicle 1 with respect to the traveling direction of the vehicle 1 and the pedestrian walking on the left side of the vehicle 1 and may differently control the intensities of the warning sounds for the pedestrians.

When the vehicle 1 is traveling on the right lane of a road, the controller 100 may control the intensities of the warning sounds output to the pedestrian walking on the right side of the vehicle 1 with respect to the traveling direction of the vehicle 1 to be greater than the intensities of the warning sounds output to the pedestrian walking on the left side of the vehicle 1.

On the other hand, when the vehicle 1 is traveling on the left lane of the road, the controller 100 may control the intensities of the warning sounds output to the pedestrian walking on the left side of the vehicle 1 with respect to the traveling direction of the vehicle 1 to be greater than the intensities of the warning sounds output to the pedestrian walking on the right side of the vehicle 1.

Also, although not shown, the imaging device 350 or the detection sensor 250 may detect a crosswalk on the road, and the controller 100 may adjust the intensities of the output warning sounds on the basis of information regarding the detected crosswalk.

That is, map information, navigation information, or the like for roads may be stored in the memory 500, and the stored information may include location information of crosswalks. The controller 100 may determine whether a pedestrian walking near the vehicle 1 crosses a road at a crosswalk on the basis of the crosswalk information stored in the memory 500 or the crosswalk information acquired by the imaging device 350 or the detection sensor 250.

When it is determined that the pedestrian is jaywalking rather than crossing the road at the crosswalk, the controller 100 may increase intensities of warning sounds output to the pedestrian.

Accordingly, the controller 100 may adjust the intensities of the warning sounds of the speaker array 400 output to the pedestrian walking near the vehicle 1 on the basis of crosswalk information of a road on which the vehicle 1 is traveling and whether the pedestrian crosses the road at a crosswalk.

While FIGS. 14 to 16 show examples in which the speaker array 400 output warnings signals in a direction in which a pedestrian is located under control of the controller 100, the speaker array 400 may output the warning sounds to the entirety of a designated area rather than only in a designated direction, as shown in FIG. 17.

That is, when a plurality of pedestrians are located near the vehicle 1, in particular, when it is determined that there are many pedestrians distributed over a large area on the basis of location information of the plurality of pedestrians acquired by the imaging device 350, the controller 100 may generate a control signal for outputting warning sounds in all forward directions of the vehicle 1 rather than only in a designated direction.

A plurality of pedestrians who form a group shown in FIG. 17 may notice the approach of the vehicle 1 through warning sounds output by the speaker array 400.

As shown in FIG. 17, when a plurality of pedestrians are located near the vehicle 1, the controller 100 may determine pedestrian distribution density of an area where the plurality of pedestrians are located on the basis of location information of the plurality of pedestrians acquired by the imaging device 350. That is, when a plurality of pedestrians are located in a certain area to form a group, the controller may compare the number of location coordinates of the pedestrians located in the certain area with predetermined data to determine whether distribution density of the plurality of pedestrians located in the certain area is high or low.

The controller 100 may determine the pedestrian distribution density to control intensities of warning sounds output to the area where the pedestrians are located. That is, the controller 100 may output warning sounds to an area with high pedestrian distribution density at high intensities and output warning sounds to an area with low pedestrian distribution density at low intensities.

Also, the controller 100 may control the range of warning sounds output to an area where the pedestrians are located on the basis of the pedestrian distribution density. That is, the controller 100 may output warning sounds to the area with high pedestrian distribution density over a wide range and output warning sounds to the area with low pedestrian distribution density over a narrow range.

Like in FIG. 17, when a plurality of pedestrians are distributed to form a group in one area, the controller 100 may perform control such that warning sounds are output to the entirety of the area over which the pedestrians are distributed. That is, the controller 100 may generate a control signal for outputting warning sounds in all forward directions of the vehicle 1 like in FIG. 17, rather than generating a control signal for outputting warning sounds only in a designated direction like in FIG. 16.

Also, when a plurality of pedestrians are distributed to form several groups in some areas, the controller 100 may generate a control signal for outputting warning sounds to the multiple areas in which the pedestrians are grouped.

Figure 18:
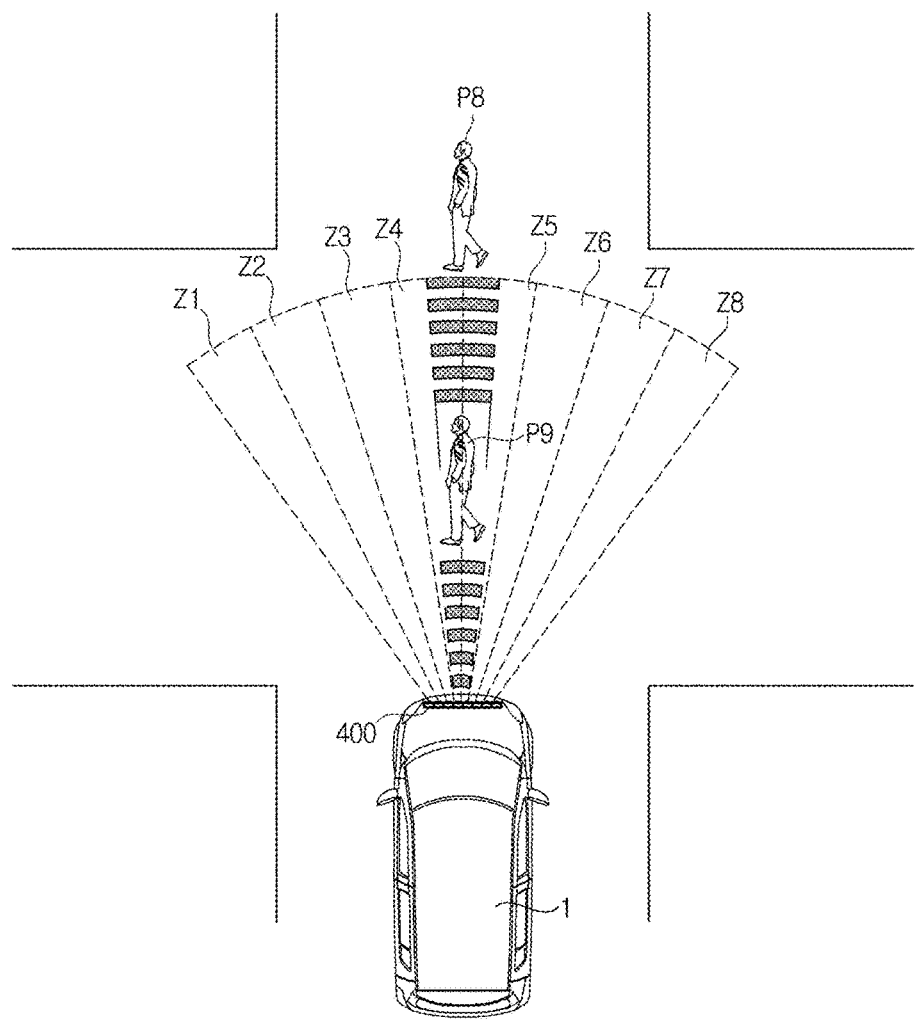
FIG. 18 is a conceptual view showing an example of controlling intensities of warning sounds on the basis of a distance between a vehicle and a pedestrian according to an embodiment.

FIG. 18 is a conceptual view showing an example of controlling intensities of warning sounds on the basis of a distance between a vehicle and a pedestrian according to an embodiment.

Referring to FIG. 18, the controller 100 may calculate a distance between the vehicle 1 and a pedestrian on the basis of location information of the pedestrian acquired by the imaging device 350 and may perform control on the basis of the calculated distance and data stored in the memory 500 so that warning sounds are output when the distance between the vehicle 1 and the pedestrian is less than or equal to a predetermined distance.

Also, the controller 100 may control intensities of the warning sounds output by the speaker array 400 on the basis of the distance between the vehicle 1 and the pedestrian.

That is, as shown in FIG. 18, when a pedestrian P9 in front of the vehicle 1 is closer to the vehicle 1 than another pedestrian P8, the pedestrian P9 has a higher risk of collision with the vehicle 1 than the pedestrian P8. Accordingly, the controller 100 may increase intensities of warning sounds output to the pedestrian P9. On the other hand, the controller 100 may decrease intensities of warning sounds output to the pedestrian P8 relatively far from the vehicle 1.

That is, when a plurality of pedestrians are located near the vehicle 1, the controller 100 may output warning sounds to nearby pedestrians at high intensities and output warning sounds to distant pedestrians at low intensities on the basis of distances between the vehicle 1 and the plurality of pedestrians, thus preventing generation of unnecessary noise while efficiently delivering the warning sounds.

Although not shown, the controller 100 may calculate a TTC between the vehicle 1 and a pedestrian and may control intensities of the warning sounds output by the speaker array 400 on the basis of the calculated TTC. When the calculated TTC is long, the possibility of collision between the vehicle 1 and the pedestrian is low. In this case, the controller 100 may output warning sounds to the pedestrian at low intensities.

Figure 19:
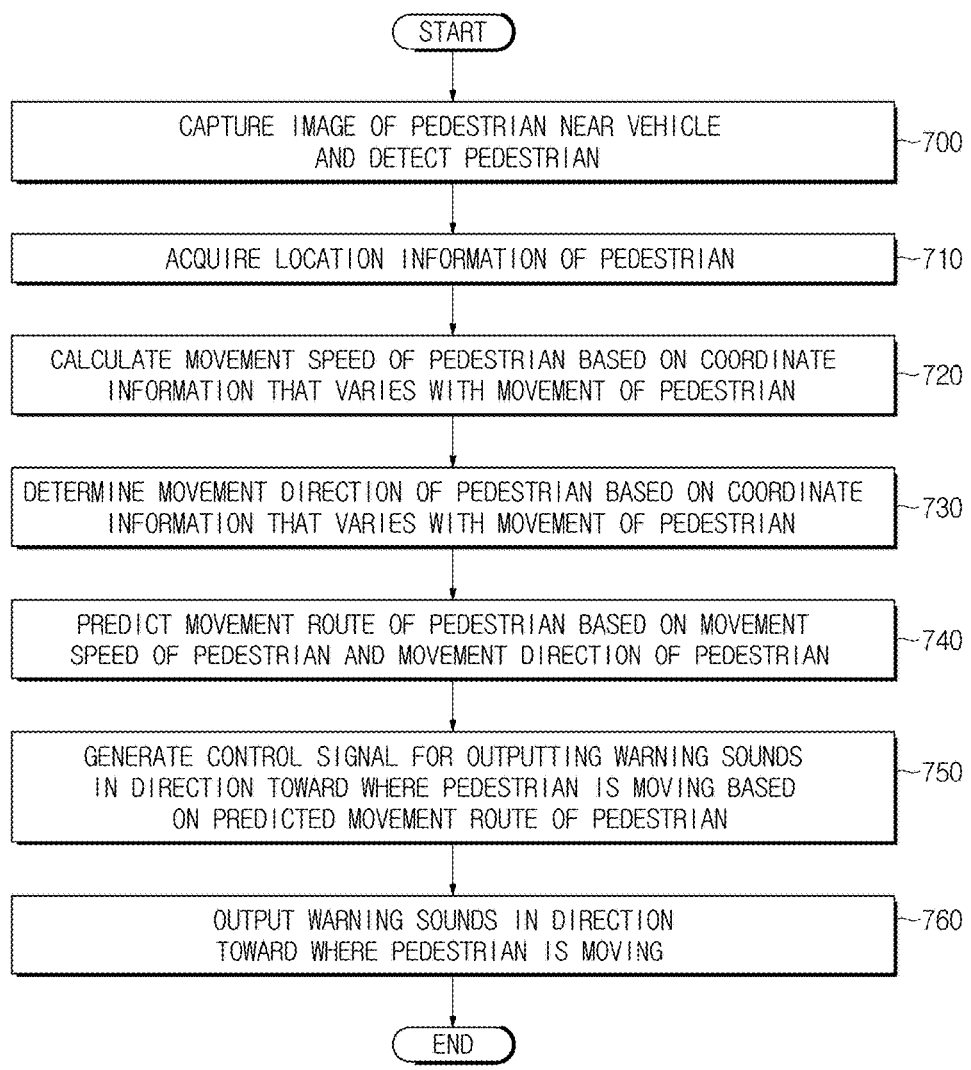
FIG. 19 is a flowchart showing a vehicle control method according to an embodiment.

FIG. 19 is a flowchart showing a vehicle control method according to an embodiment.

Referring to FIG. 19, the imaging device 350 may capture an image of a pedestrian near the vehicle 1 that is running or parked and detect the pedestrian (700), and the detection sensor 250 may acquire location information of the pedestrian near the vehicle 1 (710). In detail, the detection sensor 250 may acquire coordinate information of the pedestrian with respect to the vehicle 1. In this case, the imaging device 350 may also acquire the location information of the pedestrian on the basis of the captured image.

When there are a plurality of pedestrians, the detection sensor 250 may acquire location information of the plurality of pedestrians and deliver the acquired location information of the plurality of pedestrians to a controller 100.

Also, coordinate information that varies with movement of the pedestrian and a distance between the vehicle 1 and the pedestrian may be acquired by the detection sensor 250 and delivered to the controller 100.

The controller 100 may calculate a movement speed of the pedestrian on the basis of the coordinate information that varies with the movement of the pedestrian (720). That is, the controller 100 may find a movement distance when the varying coordinate information of the pedestrian is acquired and may calculate the movement speed of the pedestrian on the basis of a time at which the detection sensor 250 acquires the varying coordinate information.

The controller 100 may determine a movement direction of the pedestrian on the basis of the coordinate information that varies with the movement of the pedestrian (730). That is, the detection sensor 250 may acquire the coordinate information of the pedestrian that varies in real time, and thus the controller 100 may determine the movement direction of the pedestrian on the basis of the variation in the coordinate information and a vector of the coordinates.

The controller 100 may predict a movement route of the pedestrian on the basis of the calculated movement speed of the pedestrian and the determined movement direction of the pedestrian (740) and may generate a control signal for outputting warning sounds in a direction toward where the pedestrian is moving on the basis of the predicted movement route of the pedestrian (750).

Figure 20:
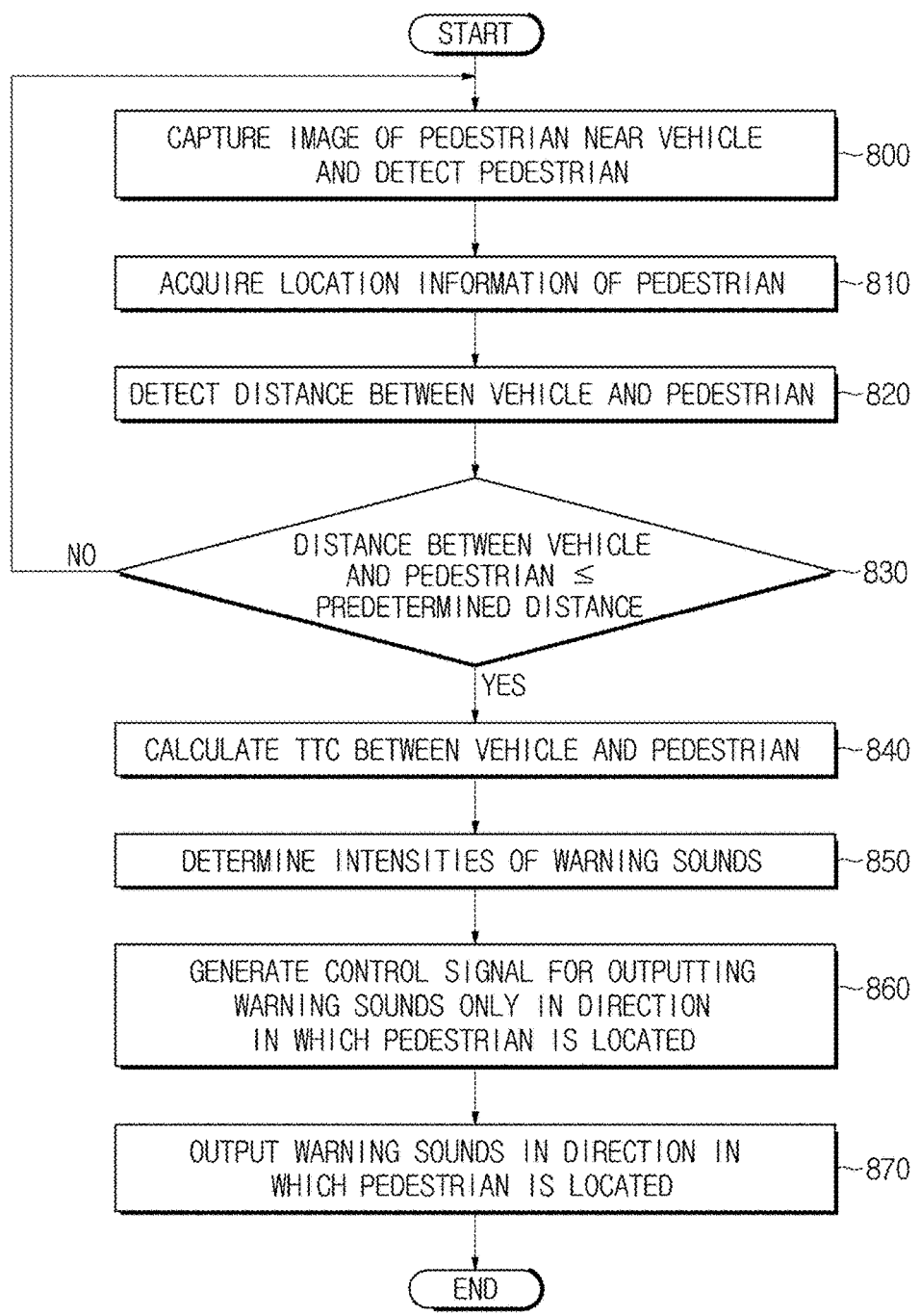
FIG. 20 is a flowchart showing a vehicle control method according to another embodiment.

The speaker array 400 may output the warning sounds in the direction toward where the pedestrian is moving on the basis of the control signal generated by the controller 100 (760) and may output the warning sounds even in a direction in which the pedestrian is located. FIG. 20 is a flowchart showing a vehicle control method according to another embodiment.

Referring to FIG. 20, the imaging device 350 may capture an image of a pedestrian near the vehicle 1 that is running or parked and detect the pedestrian (800) and may acquire location information of the pedestrian on the basis of the captured image (810). In this case, when there are a plurality of pedestrians, the imaging device 350 may acquire location information of the plurality of pedestrians, and the location information may include coordinate information of the pedestrians. When the pedestrian is moving, the imaging device 350 may acquire location information of the pedestrian that varies with the movement of the pedestrian and may acquire coordination information and speed information of the pedestrian in real time and deliver the acquired information to the controller 100.

The detection sensor 250 may detect a distance between the vehicle 1 and the pedestrian (820). The controller 100 may compare the distance between the vehicle 1 and the pedestrian detected by the detection sensor 250 with a predetermined distance on the basis of data stored in the memory 500 (830), and may calculate a TTC between the vehicle 1 and the pedestrian when the distance between the vehicle 1 and the pedestrian is less than or equal to the predetermined distance (840). The TTC may be obtained by measuring the distance between the vehicle 1 and the pedestrian on the basis of the coordinate information of the pedestrian and then dividing the measured distance by a relative speed of the vehicle 1 and the pedestrian.

The controller 100 may determine intensities of warning sounds output by the speaker array 400 on the basis of the distance and TTC between the pedestrian and the vehicle 1 (850).

That is, on the basis of the location information of the pedestrian, the controller 100 may increase the intensities of the warning sounds output by the speaker array 400 when the distance between the vehicle 1 and the pedestrian is short and, on the other hand, may decrease the intensities of the warning sounds when the distance is long. Also, the controller 100 may decrease the intensities of the warning sounds output by the speaker array 400 when the TTC between the vehicle and the pedestrian is long and, on the other hand, may increase the intensities of the warning sounds when the TTC is short.

The controller 100 may generate a control signal for outputting the warning sounds only in a direction in which the pedestrian is located on the basis of the location information of the pedestrian acquired by the imaging device 350 (860), and the speaker array 400 may output the warning sounds only in the direction in which the pedestrian is located under control of the controller 100 (870). That is, it is possible to prevent generation of unnecessary noise due to warning sounds output to places where there are no pedestrians and to effectively output warning sounds to the pedestrian.

That is, the controller 100 combines control signals for warning sounds output by a plurality of speakers included in the speaker array 400 to enable destructive interference to occur between warning sounds output in directions in which no pedestrians are located so that the warning sounds may be removed and enable constructive interference to occur between warning sounds output in directions in which pedestrians are located so that the warning sounds may be amplified. Thus, it is possible to effectively output the warning sounds in the directions in which pedestrians are located.

According to an embodiment, it is possible to make it easier for pedestrians to be aware of a vehicle and thus prevent an accident in advance by acquiring location information of a pedestrian near the vehicle, predicting a movement route of the pedestrian in real time, and outputting warning sounds in a certain direction toward where the pedestrian is moving.

It is also possible to reduce generation of unnecessary noise by outputting warning sounds only to a designated area where a pedestrian is located based on location information of the pedestrian.

The disclosed embodiments may be implemented in the form of a recording medium for storing instructions that are executable by a computer. The instructions may be stored in the form of program code, and may create a program module and perform operations of the disclosed embodiments when executed by a processor. The recording medium may be implemented as a computer-readable recording medium.

The computer-readable recording medium includes any type of recording medium that stores instructions that may be read by a computer. Examples of the computer-readable recording medium may include a ROM, a RAM, a magnetic tape, a magnetic disk, a flash memory, an optical data storage device, etc.

The disclosed embodiments have been described with reference to the accompanying drawings. It should be understood by those skilled in the art that various changes in form and details may be made therein without departing from the spirit and scope of the present invention. The disclosed embodiments are illustrative and should not be construed restrictively.

What is claimed is:

1. A vehicle comprising:
an imaging device configured to capture an image of a pedestrian and process the image to acquire location information of the pedestrian;
a controller configured to predict a movement route of the pedestrian based on the acquired location information of the pedestrian and further configured to generate a control signal for generating sound outputs that can cause constructive interference in a direction toward a predicted location to which the pedestrian is moving and can further cause destructive interference in other directions based on the predicted movement route of the pedestrian; and
a speaker array configured to generate sound outputs based on the control signal, wherein the control signal is configured to generate the sound outputs to cause amplification of a warning sound in the direction toward the predicted location by the constructive interference and further to cause lessening of the warning sound in other directions by the destructive interference,
wherein, when there are a plurality of pedestrians, the control signal is configured to generate the sound outputs for producing the warning sound to the plurality of pedestrians at the same time by the constructive interference for amplifying the warning sound in the direction toward the predicted location for each of the plurality of pedestrians and by the destructive interference for lessening the warning sound in other directions based on the predicted movement route of each of the plurality of pedestrians,
wherein the controller is configured to:
determine pedestrian distribution density of an area based on the location information of the plurality of pedestrians acquired by the imaging device,
control the warning sound to the area such that a warning sound to an area having a higher pedestrian distribution density has a higher intensity than a warning sound to an area having a lower pedestrian distribution density, and
control the warning sound to the area such that a warning sound to an area having a higher pedestrian distribution density is output to a wider range than a warning sound to an area having a lower pedestrian distribution density.

2. The vehicle of claim 1, further comprising a detection sensor configured to acquire coordinate information of the pedestrian with respect to the vehicle.

3. The vehicle of claim 1, further comprising a detection sensor configured to acquire coordinate information that varies with movement of the pedestrian.

4. The vehicle of claim 1, further comprising a detection sensor configured to detect a distance between the vehicle and the pedestrian.

5. The vehicle of claim 3, wherein the controller is configured to calculate a movement speed of the pedestrian based on the coordinate information.

6. The vehicle of claim 5, wherein the controller is configured to determine a movement direction of the pedestrian based on the coordinate information that varies with movement of the pedestrian.

7. The vehicle of claim 6, wherein the controller is configured to predict the movement route of the pedestrian based on the calculated movement speed of the pedestrian and the determined movement direction of the pedestrian.

8. The vehicle of claim 1, further comprising a detection sensor that includes at least one of a radar device and a LiDAR device.

9. The vehicle of claim 1, wherein the control signal is further configured for removing the warning sound in a direction toward where the pedestrian is not moving based on the predicted movement route of the pedestrian.

10. The vehicle of claim 4, wherein the controller is configured to generate the control signal for generating sound outputs when the detected distance between the vehicle and the pedestrian is less than or equal to a predetermined distance.

11. The vehicle of claim 4, wherein the controller is configured to control intensity of the warning sound by the speaker array based on the detected distance between the vehicle and the pedestrian.

12. The vehicle of claim 10, wherein the speaker array is configured to output the warning sound in the direction in which the pedestrian is located based on the generated control signal.

13. The vehicle of claim 1, wherein the imaging device is configured to acquire coordinate information of the pedestrian with respect to the vehicle by capturing the image of the pedestrian.

14. The vehicle of claim 1, wherein the speaker array is provided at the front of the vehicle.

15. A method for controlling a vehicle comprising:
capturing an image of a pedestrian to detect the pedestrian;
acquiring location information of the pedestrian;
predicting a movement route of the pedestrian based on the acquired location information of the pedestrian;
generating a control signal for generating sound outputs that can cause constructive interference in a direction toward a predicted location to which the pedestrian is moving and can further cause destructive interference in other directions based on the predicted movement route of the pedestrian;

determining pedestrian distribution density of an area based on location information of the plurality of pedestrians acquired by an imaging device, wherein the control signal is configured to control a warning sound to the area such that a warning sound to an area having a higher pedestrian distribution density has a higher intensity than a warning sound to an area having a lower pedestrian distribution density, and control the warning sound to the area such that a warning sound to an area having a higher pedestrian distribution density is output to a wider range than a warning sound to an area having a lower pedestrian distribution density; and generating sound outputs based on the control signal using a speaker array of the vehicle such that the warning sound is amplified in the direction toward the predicted location by the constructive interference and the warning sound is lessened in other directions by the destructive interference, wherein, when there are the plurality of pedestrians, the control signal is configured to generate the sound outputs for producing the warning sound to the plurality of pedestrians at the same time by the constructive interference for amplifying the warning sound in the direction toward the predicted location for each of the plurality of pedestrians and by the destructive interference for lessening the warning sound in other directions based on the predicted movement route of each of the plurality of pedestrians.

16. The method of claim 15, wherein acquiring location information of the pedestrian comprises acquiring coordinate information of the pedestrian with respect to the vehicle.

17. The method of claim 15, wherein acquiring location information of the pedestrian comprises acquiring coordinate information that varies with movement of the pedestrian.

18. The method of claim 15, further comprising detecting a distance between the vehicle and the pedestrian.

19. The method of claim 17, wherein predicting a movement route of the pedestrian comprises calculating a movement speed of the pedestrian based on the coordinate information that varies with movement of the pedestrian.

20. The method of claim 19, wherein predicting a movement route of the pedestrian comprises determining a movement direction of the pedestrian based on the coordinate information that varies with movement of the pedestrian.

21. The method of claim 20, wherein predicting a movement route of the pedestrian comprises predicting the movement route of the pedestrian based on the calculated movement speed of the pedestrian and the determined movement direction of the pedestrian.

22. The method of claim 15, wherein generating a control signal comprises removing a warning sound output in a direction toward where the pedestrian is not moving to based on the predicted movement route of the pedestrian.

23. The method of claim 18, wherein the control signal is configured for generating the warning sound in a direction toward where the pedestrian is located based on the acquired location information of the pedestrian when the detected distance between the vehicle and the pedestrian is less than or equal to a predetermined distance.

24. The method of claim 18, wherein generating a control signal comprises controlling intensity of the warning sound by the speaker array based on the detected distance between the vehicle and the pedestrian.

25. The method of claim 23, wherein generating sound outputs comprises outputting the warning sound in the direction toward where the pedestrian is located based on the generated control signal.

26. The method of claim 15, wherein the capturing of an image of a pedestrian near a vehicle to detect the pedestrian comprises acquiring coordinate information of the pedestrian with respect to the vehicle by capturing the image of the pedestrian.

* * * * *